(12) United States Patent
Breed et al.

(10) Patent No.: US 9,084,076 B2
(45) Date of Patent: Jul. 14, 2015

(54) TECHNIQUES FOR OBTAINING INFORMATION ABOUT OBJECTS

(71) Applicant: INTELLIGENT TECHNOLOGIES INTERNATIONAL, INC., Boonton, NJ (US)

(72) Inventors: David S. Breed, Miami Beach, FL (US); Wendell C. Johnson, Wilmington, CA (US); Wilbur E. DuVall, Branson West, MO (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

(21) Appl. No.: 13/664,567

(22) Filed: Oct. 31, 2012

(65) Prior Publication Data
US 2013/0078968 A1    Mar. 28, 2013

Related U.S. Application Data

(63) Continuation-in-part of application No. 11/926,302, filed on Oct. 29, 2007, now abandoned, which is a continuation of application No. 11/755,199, filed on May 30, 2007, now Pat. No. 7,911,324, which is a (Continued)

(51) Int. Cl.
*H04W 4/00* (2009.01)
*G01S 13/87* (2006.01)
(Continued)

(52) U.S. Cl.
CPC ............. *H04W 4/008* (2013.01); *G01S 13/878* (2013.01); *G06K 9/00771* (2013.01); *H01Q 1/2208* (2013.01); *H01Q 1/3241* (2013.01)

(58) Field of Classification Search
CPC ...... G06Q 10/087; G06Q 50/28; G06Q 10/08; G01S 13/878; G01S 13/75; G06K 2017/0051; G06K 17/00; G06K 19/07758; G06K 2017/0045
USPC ........... 340/10.1, 10.2, 10.3, 10.4, 10.5, 10.6, 340/572.1, 572.7, 572.2, 539.1, 539.11, 340/539.12, 539.13
See application file for complete search history.

(56) References Cited

U.S. PATENT DOCUMENTS

| | | | |
|---|---|---|---|
| 4,675,675 A | 6/1987 | Corwin et al. | |
| 4,787,040 A | 11/1988 | Ames et al. | |

(Continued)

FOREIGN PATENT DOCUMENTS

| | | |
|---|---|---|
| JP | 62-94443 S | 4/1987 |
| JP | H03-16844 A | 4/1991 |

(Continued)

OTHER PUBLICATIONS

Skybitz, "Information Services", 1 page, Dulles, VA, undated.

(Continued)

*Primary Examiner* — Nabil Syed
(74) *Attorney, Agent, or Firm* — Brian Roffe

(57) ABSTRACT

Techniques for obtaining information about an object on which a radio-frequency transceiver device is mounted when in a space defined by a vehicular frame. A request is generated at a telecommunications device for the object's location and received at an interrogator on the frame. In response to receipt of the request, the interrogator directs antennas to transmit RF signals into the space. The transceiver device returns a signal if and when it receives any signal or a signal having a particular identification from the antenna(s). Return signals from the transceiver device are received at each antenna and a processor, on the vehicle or the telecommunications device, derives information about the object based on the return signals. The derived information includes a location of the object in the space and/or an identification of the object, and may be displayed on a display of the telecommunications device.

19 Claims, 12 Drawing Sheets

Related U.S. Application Data continuation-in-part of application No. 10/940,881, filed on Sep. 13, 2004, now Pat. No. 7,663,502, which is a continuation-in-part of application No. 10/457,238, filed on Jun. 9, 2003, now Pat. No. 6,919,803, said application No. 11/755,199 is a continuation-in-part of application No. 11/082,739, filed on Mar. 17, 2005, now Pat. No. 7,421,321, which is a continuation of application No. 10/701,361, filed on Nov. 4, 2003, now Pat. No. 6,988,026, and a continuation-in-part of application No. 10/079,065, filed on Feb. 19, 2002, now Pat. No. 6,662,642, said application No. 11/755,199 is a continuation-in-part of application No. 11/278,188, filed on Mar. 31, 2006, now Pat. No. 7,313,467, which is a continuation of application No. 11/220,139, filed on Sep. 6, 2005, now Pat. No. 7,103,460, which is a continuation-in-part of application No. 11/120,065, filed on May 2, 2005, now abandoned, said application No. 11/755,199 is a continuation-in-part of application No. 11/379,078, filed on Apr. 18, 2006, now Pat. No. 7,379,800, which is a continuation-in-part of application No. 11/220,139, filed on Sep. 6, 2005, now Pat. No. 7,103,460, said application No. 11/755,199 is a continuation-in-part of application No. 11/381,609, filed on May 4, 2006, now Pat. No. 7,408,453, which is a continuation-in-part of application No. 11/220,139, filed on Sep. 6, 2005, now Pat. No. 7,103,460, said application No. 11/755,199 is a continuation-in-part of application No. 11/382,091, filed on May 8, 2006, now Pat. No. 7,549,327, which is a continuation-in-part of application No. 11/220,139, filed on Sep. 6, 2005, now Pat. No. 7,103,460, said application No. 11/755,199 is a continuation-in-part of application No. 11/422,240, filed on Jun. 5, 2006, now Pat. No. 7,630,802, which is a continuation-in-part of application No. 11/220,139, filed on Sep. 6, 2005, now Pat. No. 7,103,460, said application No. 11/755,199 is a continuation-in-part of application No. 11/428,498, filed on Jul. 3, 2006, now Pat. No. 7,880,594, which is a continuation-in-part of application No. 11/220,139, filed on Sep. 6, 2005, now Pat. No. 7,103,460, said application No. 11/755,199 is a continuation-in-part of application No. 11/457,231, filed on Jul. 13, 2006, now Pat. No. 7,760,080, which is a continuation-in-part of application No. 11/220,139, filed on Sep. 6, 2005, now Pat. No. 7,103,460, said application No. 11/755,199 is a continuation-in-part of application No. 11/461,473, filed on Aug. 1, 2006, now Pat. No. 7,786,864, which is a continuation-in-part of application No. 11/220,139, filed on Sep. 6, 2005, now Pat. No. 7,103,460, said application No. 11/755,199 is a continuation-in-part of application No. 11/470,061, filed on Sep. 5, 2006, now Pat. No. 7,527,288, which is a continuation-in-part of application No. 11/220,139, filed on Sep. 6, 2005, now Pat. No. 7,103,460, and application No. 10/079,065, said application No. 10/940,881 is a continuation-in-part of application No. 10/931,288, filed on Aug. 31, 2004, now Pat. No. 7,164,117, said application No. 11/755,199 is a continuation-in-part of application No. 11/554,342, filed on Oct. 30, 2006, now Pat. No. 7,467,034, and a continuation-in-part of application No. 11/565,020, filed on Nov. 30, 2006, now abandoned, which is a continuation-in-part of application No. 10/931,288, filed on Aug. 31, 2004, now Pat. No. 7,164,117, said application No. 11/755,199 is a continuation-in-part of application No. 11/620,800, filed on Jan. 8, 2007, now abandoned, and a continuation-in-part of application No. 11/278,979, filed on Apr. 7, 2006, now Pat. No. 7,386,372, and a continuation-in-part of application No. 11/380,574, filed on Apr. 27, 2006, now Pat. No. 8,159,338, and a continuation-in-part of application No. 11/420,497, filed on May 26, 2006, now abandoned, and a continuation-in-part of application No. 11/421,500, filed on Jun. 1, 2006, now Pat. No. 7,672,756, which is a continuation-in-part of application No. 11/220,139, filed on Sep. 6, 2005, now Pat. No. 7,103,460, said application No. 11/428,498 is a continuation-in-part of application No. 10/931,288, filed on Aug. 31, 2004, now Pat. No. 7,164,117, said application No. 11/457,231 is a continuation-in-part of application No. 10/931,288, filed on Aug. 31, 2004, now Pat. No. 7,164,117, said application No. 11/755,199 is a continuation-in-part of application No. 11/459,700, filed on Jul. 25, 2006, now abandoned, which is a continuation-in-part of application No. 11/220,139, filed on Sep. 6, 2005, now Pat. No. 7,103,460, said application No. 11/461,473 is a continuation-in-part of application No. 10/931,288, filed on Aug. 31, 2004, now Pat. No. 7,164,117, said application No. 11/755,199 is a continuation-in-part of application No. 11/464,288, filed on Aug. 14, 2006, now Pat. No. 7,650,210, which is a continuation-in-part of application No. 10/931,288, filed on Aug. 31, 2004, now Pat. No. 7,164,117, said application No. 11/755,199 is a continuation-in-part of application No. 11/558,314, filed on Nov. 9, 2006, now Pat. No. 7,831,358, which is a continuation-in-part of application No. 10/931,288, filed on Aug. 31, 2004, now Pat. No. 7,164,117, said application No. 11/755,199 is a continuation-in-part of application No. 11/619,838, filed on Jan. 4, 2007, now Pat. No. 7,659,813, which is a continuation-in-part of application No. 10/931,288, filed on Aug. 31, 2004, now Pat. No. 7,164,117, said application No. 11/755,199 is a continuation-in-part of application No. 11/677,858, filed on Feb. 22, 2007, now Pat. No. 7,889,096, which is a continuation-in-part of application No. 11/681,834, filed on Mar. 5, 2007, now Pat. No. 8,169,311, said application No. 11/926,302 is a continuation of application No. 11/755,199, filed on May 30, 2007, now Pat. No. 7,911,324, and application No. 10/079,065.

(60) Provisional application No. 60/387,792, filed on Jun. 11, 2002, provisional application No. 60/423,613, filed on Nov. 4, 2002, provisional application No. 60/461,648, filed on Apr. 8, 2003, provisional application No. 60/592,838, filed on Jul. 30, 2004, provisional application No. 60/304,013, filed on Jul. 9, 2001, provisional application No. 60/269,415, filed on Feb. 16, 2001, provisional application No. 60/291,511, filed on May 16, 2001.

(51) Int. Cl.
*H01Q 1/22* (2006.01)
*G06K 9/00* (2006.01)
*H01Q 1/32* (2006.01)

(56) References Cited

U.S. PATENT DOCUMENTS

| | | |
|---|---|---|
| 4,888,591 A | 12/1989 | Landt et al. |
| 4,897,642 A | 1/1990 | DiLullo et al. |
| 4,926,331 A | 5/1990 | Windle et al. |
| 5,081,667 A | 1/1992 | Driori et al. |
| 5,119,104 A | 6/1992 | Heller |
| 5,157,610 A | 10/1992 | Asano et al. |
| 5,216,429 A | 6/1993 | Nakagawa et al. |
| 5,289,160 A | 2/1994 | Fiorletta |
| 5,400,018 A | 3/1995 | Scholl et al. |
| 5,445,347 A | 8/1995 | Ng |
| 5,448,220 A | 9/1995 | Levy |

(56) References Cited

U.S. PATENT DOCUMENTS

| | | |
|---|---|---|
| 5,513,107 A | 4/1996 | Gormley |
| 5,531,122 A | 7/1996 | Chatham et al. |
| 5,561,610 A | 10/1996 | Schricker et al. |
| 5,565,858 A | 10/1996 | Guthrie |
| 5,600,301 A | 2/1997 | Robinson, III |
| 5,682,142 A | 10/1997 | Loosmore et al. |
| 5,686,888 A | 11/1997 | Welles, II et al. |
| 5,774,876 A | 6/1998 | Woolley et al. |
| 5,798,693 A | 8/1998 | Engellenner |
| 5,804,810 A | 9/1998 | Woolley et al. |
| 5,829,782 A | 11/1998 | Breed et al. |
| 5,838,229 A | 11/1998 | Robinson, III |
| 5,892,441 A | 4/1999 | Woolley et al. |
| 5,917,433 A | 6/1999 | Keillor et al. |
| 5,920,287 A | 7/1999 | Belcher et al. |
| 5,959,568 A | 9/1999 | Woolley |
| 5,995,046 A | 11/1999 | Belcher et al. |
| 6,043,738 A | 3/2000 | Stewart et al. |
| 6,112,585 A | 9/2000 | Schrottle et al. |
| 6,154,658 A | 11/2000 | Caci |
| 6,236,911 B1 | 5/2001 | Kruger |
| 6,297,692 B1 | 10/2001 | Nielsen |
| 6,331,825 B1 | 12/2001 | Ladner et al. |
| 6,414,635 B1 | 7/2002 | Steart et al. |
| 6,433,629 B2 | 8/2002 | Hamel et al. |
| 6,463,798 B2 | 10/2002 | Niekirk et al. |
| 6,485,081 B1 | 11/2002 | Bingle et al. |
| 6,492,904 B2 | 12/2002 | Richards |
| 6,512,455 B2 | 1/2003 | Finn et al. |
| 6,556,942 B1 | 4/2003 | Smith |
| 6,571,617 B2 | 6/2003 | Van Niekirk et al. |
| 6,603,818 B1 | 8/2003 | Dress, Jr. et al. |
| 6,606,350 B2 | 8/2003 | Dress, Jr. et al. |
| 6,657,586 B2 | 12/2003 | Turner |
| 6,662,642 B2 | 12/2003 | Breed et al. |
| 6,687,609 B2 | 2/2004 | Hsiao et al. |
| 6,820,897 B2 | 11/2004 | Breed et al. |
| 6,864,802 B2 | 3/2005 | Smith et al. |
| 6,900,732 B2 | 5/2005 | Richards |
| 6,919,803 B2 | 7/2005 | Breed |
| 6,927,692 B1 | 8/2005 | Petrinovic |
| 6,958,677 B1 | 10/2005 | Carter |
| 6,972,671 B2 | 12/2005 | Normann et al. |
| 6,972,682 B2 | 12/2005 | Lareau et al. |
| 7,015,824 B2 | 3/2006 | Cleveland et al. |
| 7,096,089 B2 | 8/2006 | Quackenbush et al. |
| 7,103,460 B1 | 9/2006 | Breed |
| 7,196,637 B2 | 3/2007 | Sabet et al. |
| 7,260,497 B2 | 8/2007 | Watabe |
| 7,295,115 B2 | 11/2007 | Aljadeff et al. |
| RE40,073 E | 2/2008 | Breed |
| 7,630,802 B2 | 12/2009 | Breed |
| 7,650,210 B2 | 1/2010 | Breed |
| 2002/0057208 A1 | 5/2002 | Lin et al. |
| 2002/0092347 A1 | 7/2002 | Niekirk et al. |
| 2003/0028297 A1 | 2/2003 | Iihoshi et al. |
| 2005/0065681 A1 | 3/2005 | Watabe |
| 2008/0143482 A1* | 6/2008 | Shoarinejad et al. ........ 340/10.1 |
| 2008/0150691 A1 | 6/2008 | Knadle et al. |
| 2009/0128302 A1* | 5/2009 | Srinivasan et al. ............ 340/10.6 |
| 2009/0201166 A1* | 8/2009 | Itagaki et al. .............. 340/686.1 |

FOREIGN PATENT DOCUMENTS

| | | |
|---|---|---|
| JP | H01-197145 A | 12/1993 |
| JP | 2003-162665 A | 6/2003 |

OTHER PUBLICATIONS

Skybitz, GLS Technology, "How It Works", pp. 1-3 printed Jun. 15, 2006.

Skybitz, "Trailer Tracking", Nov. 2002.

Skybitz, "Global Locating System", 1 page, Dulles, VA, undated.

Skybitz, "Mobile Terminal", 1 page, Dulles, VA, undated.

Decision from IPR 2013-00415 for U.S. Pat. No. 7,650,210, *Toyota Motor Corporation* v. *American Vehicular Sciences LLC*, dated Jan. 13, 2014.

Petition for Inter Partes Review, IPR 2014-00633 for U.S. Pat. No. 7,650,210, by *American Honda Motor Co., Inc.* v. *American Vehicular Sciences LLC* dated Apr. 15, 2014.

KN Fry, "Diesel Locomotive Reliability Improvements by System Monitoring," Proceedings of the Institution of Mechanical Engineers, Part F: Journal of Rail and Rapid Transit.

Decision from IPR 2013-00414 for U.S. Pat. No. 7,630,802, *Toyota Motor Corporation* v. *American Vehicular Sciences LLC*, dated Jan. 13, 2014.

Petition for Inter Partes Review, IPR 2014-00637 for U.S. Pat. No. 7,630,802, by *American Honda Motor Co., Inc.* v. *American Vehicular Sciences LLC* dated Apr. 15, 2014.

Petition for Inter Partes Review, IPR 2014-00638 for U.S. Pat. No. 7,630,802, by *American Honda Motor Co., Inc.* v. *American Vehicular Sciences LLC* dated Apr. 15, 2014.

Petition for Inter Partes Review, IPR 2014-00643 for U.S. Pat. No. 7,630,802, by *Mercedes-Benz USA, LLC* v. *American Vehicular Sciences LLC* dated Apr. 16, 2014.

\* cited by examiner

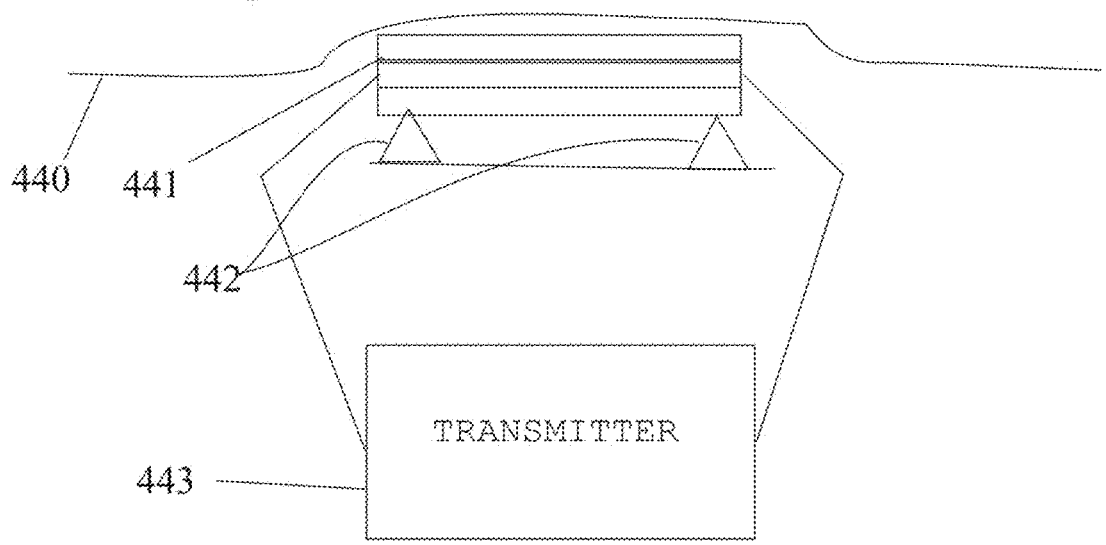
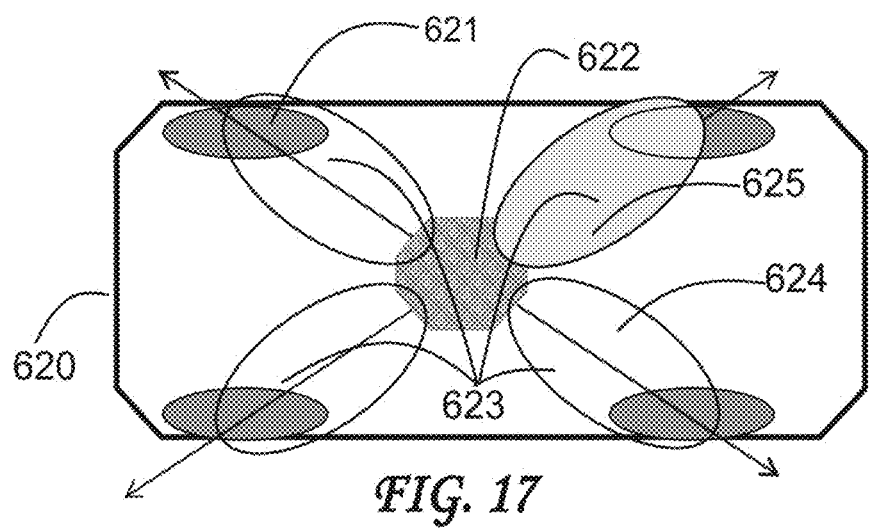
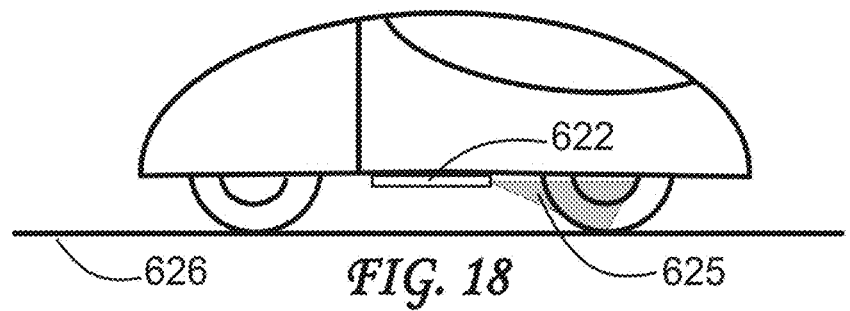

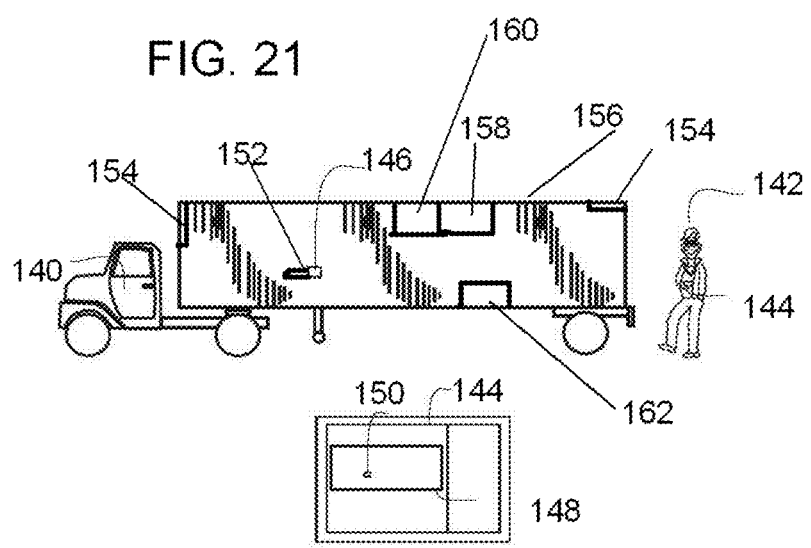

TECHNIQUES FOR OBTAINING INFORMATION ABOUT OBJECTS

CROSS REFERENCE TO RELATED APPLICATIONS

This application is a continuation-in-part (CIP) of U.S. patent application Ser. No. 11/926,302 filed Oct. 29, 2007, which is a continuation of U.S. patent application Ser. No. 11/755,199 filed May 30, 2007, which is:

1. a continuation-in-part (CIP) of U.S. patent application Ser. No. 10/940,881 filed Sep. 13, 2004 which is:
   A. a CIP of U.S. patent application Ser. No. 10/457,238 filed Jun. 9, 2003, now U.S. Pat. No. 6,919,803 which claims priority under 35 U.S.C. §119(e) of U.S. provisional patent application Ser. No. 60/387,792 filed Jun. 11, 2002;
   B. a CIP of U.S. patent application Ser. No. 10/931,288 filed Aug. 31, 2004, now U.S. Pat. No. 7,164,117;
2. a CIP of U.S. patent application Ser. No. 11/082,739 filed Mar. 17, 2005, which is a continuation of U.S. patent application Ser. No. 10/701,361 filed Nov. 4, 2003, now U.S. Pat. No. 6,988,026, which claims priority under 35 U.S.C. §119(e) of U.S. provisional patent application Ser. No. 60/423,613 filed Nov. 4, 2002, and U.S. provisional patent application Ser. No. 60/461,648 filed Apr. 8, 2003, and is a CIP of U.S. patent application Ser. No. 10/079,065 filed Feb. 19, 2002, now U.S. Pat. No. 6,662,642, which claims priority under 35 U.S.C. §119(e) of U.S. provisional patent application Ser. No. 60/269,415 filed Feb. 16, 2001, U.S. provisional patent application Ser. No. 60/291,511 filed May 16, 2001, and U.S. provisional patent application Ser. No. 60/304,013 filed Jul. 9, 2001;
3. a CIP of U.S. patent application Ser. No. 11/278,188 filed Mar. 31, 2006 which is a continuation of U.S. patent application Ser. No. 11/220,139 filed Sep. 6, 2005, now U.S. Pat. No. 7,103,460, which is a CIP of U.S. patent application Ser. No. 11/120,065 filed May 2, 2005, now abandoned, which claims priority under 35 U.S.C. §119(e) of U.S. provisional patent application Ser. No. 60/592,838 filed Jul. 30, 2004;
4. a CIP of U.S. patent application Ser. No. 11/278,979 filed Apr. 7, 2006;
5. a CIP of U.S. patent application Ser. No. 11/379,078 filed Apr. 18, 2006 which is a CIP of U.S. patent application Ser. No. 11/220,139 filed Sep. 6, 2005, the history of which is set forth above;
6. a CIP of U.S. patent application Ser. No. 11/380,574 filed Apr. 27, 2006;
7. a CIP of U.S. patent application Ser. No. 11/381,609 filed May 4, 2006 which is a CIP of U.S. patent application Ser. No. 11/220,139 filed Sep. 6, 2005, the history of which is set forth above;
8. a CIP of U.S. patent application Ser. No. 11/382,091 filed May 8, 2006 which is a CIP of U.S. patent application Ser. No. 11/220,139 filed Sep. 6, 2005, U.S. Pat. No. 7,103,460, the history of which is set forth above;
9. a CIP of U.S. patent application Ser. No. 11/420,497 filed May 25, 2006;
10. a CIP of U.S. patent application Ser. No. 11/421,500 filed Jun. 1, 2006 which is a CIP of U.S. patent application Ser. No. 11/220,139 filed Sep. 6, 2005, the history of which is set forth above;
11. a CIP of U.S. patent application Ser. No. 11/422,240 filed Jun. 5, 2006 which is a CIP of U.S. patent application Ser. No. 11/220,139 filed Sep. 6, 2005, the history of which is set forth above;
12. a CIP of U.S. patent application Ser. No. 11/428,498 filed Jul. 3, 2006 which is:
    A. a CIP of U.S. patent application Ser. No. 10/931,288 filed Aug. 31, 2004, now U.S. Pat. No. 7,164,117, and
    B. a CIP of U.S. patent application Ser. No. 11/220,139 filed Sep. 6, 2005, the history of which is set forth above;
13. a CIP of U.S. patent application Ser. No. 11/457,231 filed Jul. 13, 2006 which is:
    A. a CIP of U.S. patent application Ser. No. 10/931,288 filed Aug. 31, 2004, now U.S. Pat. No. 7,164,117, and
    B. a CIP of U.S. patent application Ser. No. 11/220,139 filed Sep. 6, 2005, the history of which is set forth above;
14. a CIP of U.S. patent application Ser. No. 11/459,700 filed Jul. 25, 2006 which is a CIP of U.S. patent application Ser. No. 11/220,139 filed Sep. 6, 2005, the history of which is set forth above;
15. a CIP of U.S. patent application Ser. No. 11/461,473 filed Aug. 1, 2006 which is:
    A. a CIP of U.S. patent application Ser. No. 10/931,288 filed Aug. 31, 2004, now U.S. Pat. No. 7,164,117, and
    B. a CIP of U.S. patent application Ser. No. 11/220,139 filed Sep. 6, 2005, the history of which is set forth above;
16. a CIP of U.S. patent application Ser. No. 11/464,288 filed Aug. 14, 2006 which is a CIP of U.S. patent application Ser. No. 10/931,288 filed Aug. 31, 2004, now U.S. Pat. No. 7,164,117;
17. a CIP of U.S. patent application Ser. No. 11/470,061 filed Sep. 5, 2006 which is a CIP of U.S. patent application Ser. No. 11/220,139 filed Sep. 6, 2005, the history of which is set forth above;
18. a CIP of U.S. patent application Ser. No. 11/554,342 filed Oct. 30, 2006;
19. a CIP of U.S. patent application Ser. No. 11/558,314 filed Nov. 9, 2006 which is a CIP of U.S. patent application Ser. No. 10/931,288 filed Aug. 31, 2004, now U.S. Pat. No. 7,164,117;
20. a CIP of U.S. patent application Ser. No. 11/565,020 filed Nov. 30, 2006 which is a CIP of U.S. patent application Ser. No. 10/931,288 filed Aug. 31, 2004, now U.S. Pat. No. 7,164,117;
21. a CIP of U.S. patent application Ser. No. 11/619,838 filed Jan. 4, 2007 which is a CIP of U.S. patent application Ser. No. 10/931,288 filed Aug. 31, 2004, now U.S. Pat. No. 7,164,117;
22. a CIP of U.S. patent application Ser. No. 11/620,800 filed Jan. 8, 2007;
23. a CIP of U.S. patent application Ser. No. 11/677,858 filed Feb. 22, 2007; and
24. a CIP of U.S. patent application Ser. No. 11/681,834 filed Jan. 8, 2007.

All of the foregoing patent application and all references, patents and patent applications that are referred to below are incorporated by reference in their entirety as if they had each been set forth herein in full.

FIELD OF THE INVENTION

The present invention relates generally to methods and systems for obtaining information about tagged objects, and more particularly to methods and systems for obtaining the location of, determining motion of and identifying objects within an asset using tags.

BACKGROUND OF THE INVENTION

Background of the invention is found in U.S. Pat. Nos. 6,820,897 and 6,919,803, and U.S. patent application Ser. No.

11/025,501, and additional information about the invention and its applicability, usage, fabrication, installation, synergy with other inventions and as well as U.S. patent application Ser. Nos. 11/502,039, 11/455,497, 10/940,881, 10/931,288, 10/895,121, 10/805,903, 10/733,957, 10/413,426, 10/365,129, 10/356,202, 10/227,780, 10/174,709, 10/151,615, 10/114,533, 10/058,706, 09/891,432, 09/838,920, 09/737,138, 09/563,556, 09/543,678, 09/437,535, 09/084,641, 09/047,704, 09/047,703, 08/640,068, 08/239, all of which are incorporated by reference herein.

Definitions in the Background of the Invention section of the '501 application are also generally, but not restrictively, applicable herein.

SUMMARY OF THE INVENTION

Method for obtaining information about an object on which a radio-frequency transceiver device is mounted when the transceiver device is in a space defined by a frame of a vehicle includes generating a request at a portable telecommunications device for location of the object in the space, the portable telecommunications device being usable when separate and apart from the vehicle, and receiving at an interrogator on the frame, the request generated at the telecommunications device and after and in response to receipt of the request, causing the interrogator to direct one or more antennas on the frame to transmit radio frequency signals into the space. The transceiver device may be an active transmitter device that includes a power source and returns a signal if and when the transceiver device receives any signal or a signal having a particular identification from the antenna(s). The method also includes receiving, at the antenna(s), any return signals from the transceiver device, deriving, using a processor on the vehicle or on the telecommunications device, information about the object on which the transceiver device is mounted based on the return signals, the derived information including a location of the object in the space defined by the frame and/or an identification of the object, and displaying on a display of the telecommunications device, the information.

The telecommunications device may be configured to generate the request based on an identification of the object or an identification of the transceiver device mounted to the object, such that each interrogator is caused to direct one or more antennas to transmit radio frequency signals with the identification. As such, the transceiver device returns a signal only when it receives a signal having its identification. When the processor is on the vehicle, the method includes wirelessly transmitting, using a communications device on the frame that is coupled to the processor, the information about the object on which the transceiver device is mounted to the telecommunications device.

A related arrangement for obtaining information about an object on which a radio-frequency transceiver device is mounted when the transceiver device is in a space defined by a frame of a vehicle includes a frame defining an interior space of the vehicle, at least one antenna arranged on the frame and enabling transmission of radio frequency signals into the space and reception of signals from the space, a portable telecommunications device that generates a request for location of the object in the space and is usable when separate and apart from the vehicle, and at least one interrogator coupled to the antenna(s) and that receives the request generated at the telecommunications device. After and in response to receipt of the request, each interrogator controls transmission of radio frequency signals by the antenna(s) into the space. When a transceiver device in the space, that is an active transmitter device having a power source, receives any signal or a signal having a particular identification from the at least one antenna, it generates a return signal received by the antenna(s). A processor is coupled to the at least one antenna and derives information about the object on which the transceiver device is mounted based on the return signals, the derived information including at least one of a location of the object in the space defined by the frame and an identification of the object. The telecommunications device includes a display on which the information is displayed.

A method for enabling an individual such as a driver to locate an object in a container of a vehicle, wherein the object has a radio-frequency transceiver device arranged in connection therewith at least when the object is in a space defined by the container, includes generating, by means of the individual using an user interface of a portable telecommunications device, a request for location of the object in the space defined by the container, the portable telecommunications device being usable when separate and apart from the vehicle, receiving at one or more interrogators on the container, the request generated at the telecommunications device, and after and in response to receipt of the request, causing each interrogator to direct one or more antennas on the container to transmit radio frequency signals into the space. The transceiver device is an active transmitter device that includes a power source and returns a signal if and when the transceiver device receives any signal or a signal having a particular identification from the at least one antenna. Using a processor, information about the object on which the transceiver device is mounted is derived based on return signals received at the antenna(s), the derived information including at least one of a location of the object in the space defined by the frame and an identification of the object. Then, using the telecommunications device, the individual is provided with the information about at least one of the location of the object in the space defined by the frame and the identification of the object. This latter step may entail displaying on a display of the telecommunications device viewable to the individual, the information about at least one of the location of the object in the space defined by the frame and the identification of the object.

A computer program is usable with the embodiments described above and is resident on a telecommunications device that enables an individual to locate an object in a container of a vehicle. The computer program is resident on computer-readable storage media and is configured to generate, by means of the individual using a user interface of the telecommunications device, a request for location of the object in the space defined by the container, cause at least one interrogator on the container to direct at least one antenna on the container to transmit radio frequency signals into the space after and in response to receipt of the generated request, derive information about the object on which the transceiver device is mounted based on return signals from the transceiver device received at the at least one antenna, and provide, using the telecommunications device, the individual with the information about the object.

The foregoing embodiment provide new and improved methods and systems for obtaining information about transceiver devices and transceiver-equipped objects in order to monitor such objects, as well as assets equipped with a monitoring system for monitoring transceiver-equipped objects, e.g., a truck and trailer combination.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 16H illustrates one embodiment of a switch whereby activation of the switch provides the energy necessary to power a transceiver.

FIG. 17 is a top view of a system for obtaining information about a vehicle or a component therein, specifically information about the tires, such as pressure and/or temperature thereof.

FIG. 18 is a side view of the vehicle shown in FIG. 17.

FIG. 21 is a side view of an arrangement of a vehicle and a system for providing a driver with information about location of an object in an interior of the vehicle.

FIG. 22 is a view of a display presented to the driver showing location of an object in an interior of the vehicle.

DETAILED DESCRIPTION OF THE INVENTION

Although many of the examples below relate to a cargo space in an asset, the invention is not limited to any particular space in any particular asset and is thus applicable to all types of assets including vehicles, shipping containers and truck trailers and to all spaces or compartments of a vehicle including, for example, the passenger compartment and the trunk of an automobile or truck.

Figure 7:
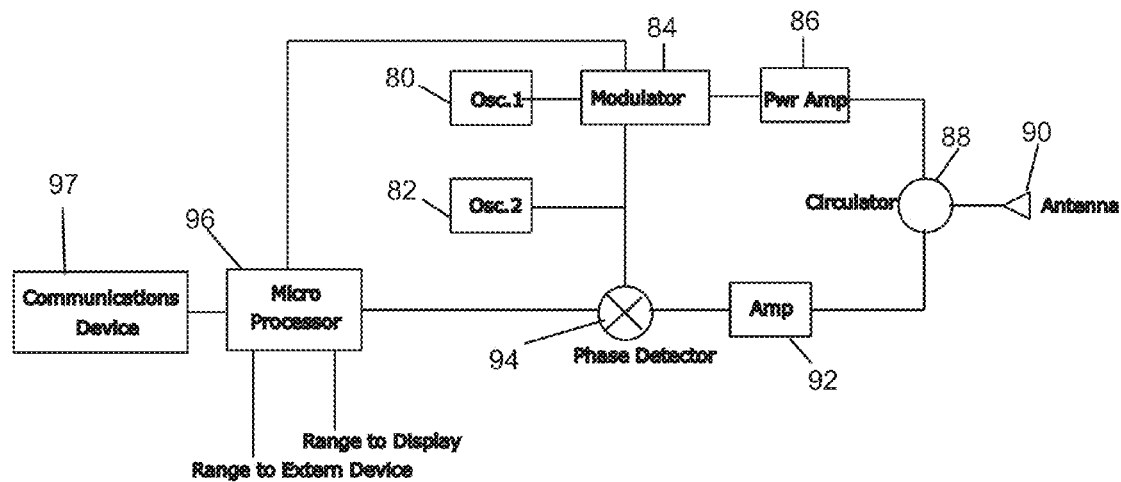
Figure 8:
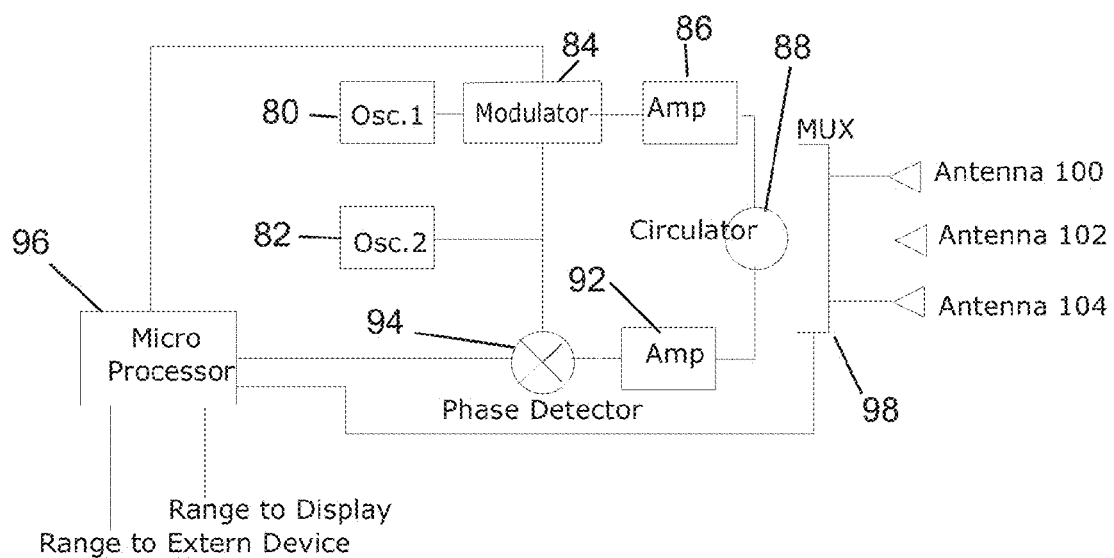
FIG. 8 is a block diagram of an interrogator with multiple antennas which may be used in the invention.
Figure 9:
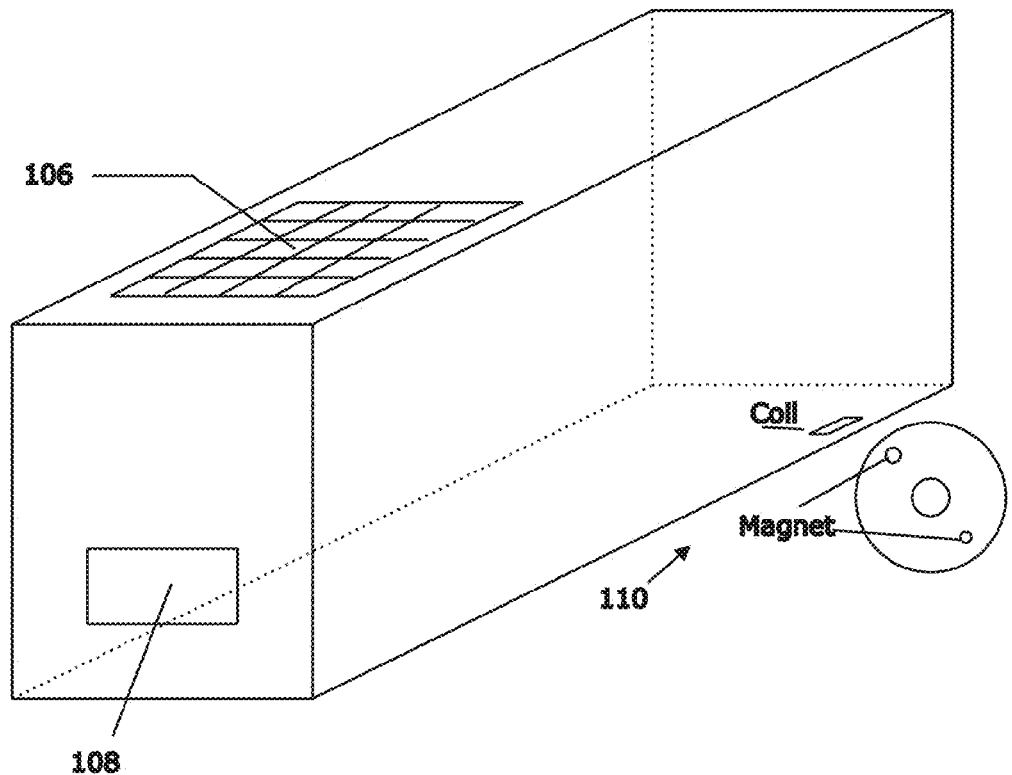
FIG. 9 illustrates systems for deriving or harvesting electrical power for use in the invention.

Referring to the accompanying drawings, FIGS. 1-10 illustrate a method and system for identifying and locating a transceiver-tagged article inside a cargo space defined by a frame. The transceiver tags can be active, passive or a combination of both, or MIR transceivers, or devices providing backscatter. The system can employ multiple antennas inside a cargo space, truck trailer or other vehicle cargo space as illustrated in FIGS. 1-6. The system is preferably designed for a low power battery operation when the cargo space is not tethered to a power source. Some energy harvesting methods for powering the system are shown in FIG. 9. The system requires little power and has a low duty cycle when not connected to a power source thus the system will provide transceiver tag identification for many years with internal battery power.

A passive transceiver tag can operate at about 915 MHz (ISM band) complying with FCC rule 15, for example, or other rules that may apply either in the US or other countries. The frequency can be any frequency permitted under these rules.

Figure 1:
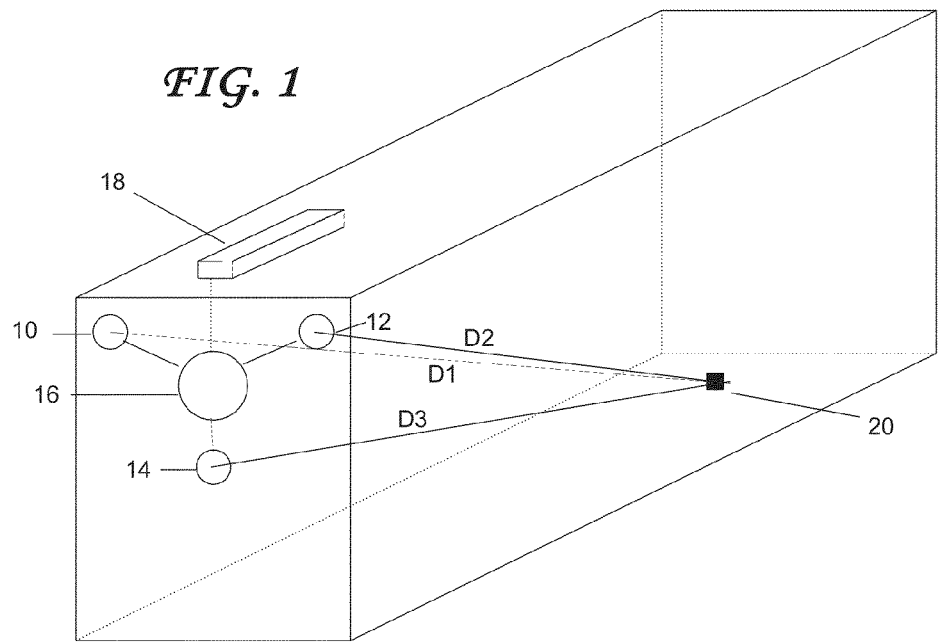
FIG. 1 illustrates a first embodiment of a cargo space equipped with a system in accordance with the invention for obtaining information from a tagged object in the cargo space.

FIG. 1 illustrates an embodiment of a cargo space with three antennas 10, 12, 14 spaced in a triangular fashion and connected to an interrogator 16 internal to the cargo space with the antennas 10, 12, 14 shown in one possible configuration arranged on a common wall of the cargo space. The internal arrangement of the interrogator 16 to the cargo space means that the interrogator is arranged on one or more of the walls defining the cargo space, inside or within one or more of the walls defined the cargo space and/or within the space defined by the walls of the cargo space. Specifically, for the shipping container shown in FIG. 1 having a pair of opposed side walls, a pair of opposed front and rear walls, a roof and a floor, the antennas 10, 12, 14 are arranged in the front wall. This wall may the fixed wall opposite the door of the shipping container. In other embodiments, the antennas 10, 12, 14 are arranged in the other walls of the container.

The interrogator 16 may be arranged within the triangle defined by the antennas 10, 12, 14, for example, at or about the approximate center of the triangle. In other embodiments with multiple antennas, the interrogator may be situated to be equidistant from all of them. Nevertheless, the location of the interrogator relative to the antennas is not critical to the practice of the invention and the interrogator may be placed anywhere on the asset defining the cargo space, or even separate and apart from the asset, as described below. The interrogator 16 may be connected to the antennas 10, 12, 14 using wires or wirelessly.

The interrogator 16 can be connected to a satellite or other communication unit 18 from the interior of the cargo space using a wire or wirelessly using an antenna. As shown, communication unit 18 is arranged on a roof of the asset. The satellite or other communication unit 18 can have an external antenna and can be used to send tag information to a remote site. The distances from each antenna 10, 12, 14 to a transceiver device or tag 20 are shown as D1, D2 and D3. These distances can be measured by an interrogator 16 shown schematically in FIG. 8, or by a processor associated with or resident within the interrogator 16 or separate therefrom. The processor could also process the distances to derive other information about the transceiver device 20 or an object in connection with which the transceiver device 20 is mounted. For example, such a processor can also derive additional or alternative information about the transceiver device 20, such as motion thereof or its identification if it is designed to generate a return signal with identification data.

There are known arrangements of or programming for interrogator 16, or the processor associated therewith, to measure or otherwise determine distances D1, D2 and D3 based on the return signals. However, in one particular embodiment, transceiver devices 20 are used which have the capability of returning a signal at a precise time with this knowledge being used to determine the distance between the transceiver device or object in connection therewith and the antennas 10, 12, 14. To achieve this, the interrogator 16 and transceiver device 20 are each provided with a clock, and the transceiver device 20 synchronizes its clock upon reception of any signal from any of the antennas 10, 12, 14 relative to the interrogator's clock returns a signal, if it receives any signal from any of the antennas 10, 12, 14, only after synchronization of its clock to the interrogator's clock. The interrogator 16, or processor associated therewith, is arranged or programmed to predict a transmit time at which the transceiver device 20 will return a signal after reception of a signal whose transmission is controlled by the interrogator 16. The actual arrival time of the return signal from the transceiver device 20 is analyzed relative to the predicted transmit time (the time the return signal was transmitted by the transceiver device 20), e.g., compared thereto, to enable a measurement of a distance between the transceiver device 20 and the antennas 10, 12, 14 to be determined. Thus, in this embodiment, the transceiver device 20 returns a signal at a specific time after receipt of an interrogation signal or pulse from one or more of the antennas 10, 12, 14, at a specific time after the signal or pulse was sent by one or more of the antennas 10, 12, 14 or at an appointed or predesignated time. In the latter case, predesignation of times might entail creating a specific formula for determining the predesignated times.

In one embodiment when the interrogator 16 causes transmission of signals from multiple antennas 10, 12, 14, the transceiver 20 when receiving signals from one or more of these antennas 10, 12, 14 may be arranged or programmed to provide information in the return signal indicative of a phase or relative time of reception of signals from the multiple antennas. The processor associated with the interrogator 16 would analyze the return signals and, from the phase or time reception information, derive information about the transceiver device 20 or object to which it is mounted, such as distance information or motion information.

Figure 2:
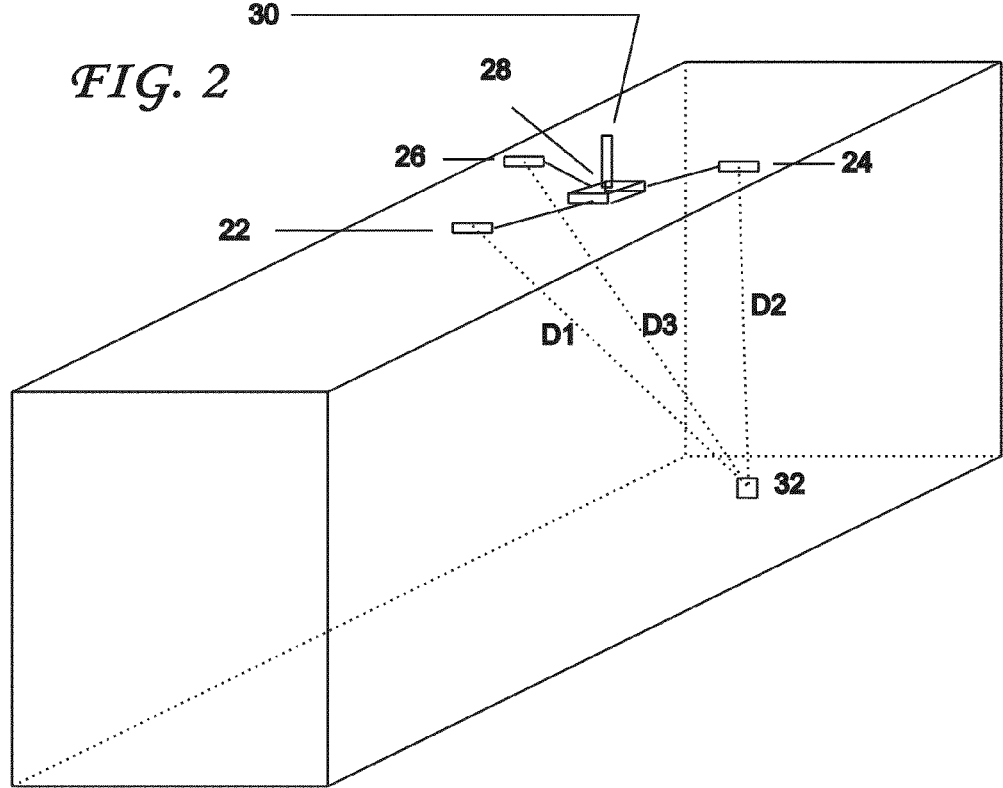
FIG. 2 illustrates a second embodiment of a cargo space equipped with a system in accordance with the invention for obtaining information from a tagged object in the cargo space.

FIG. 2 illustrates an embodiment of a cargo space with three antennas 22, 24, 26 spaced in a triangular fashion located on the roof, ceiling or top of the shipping container defining the cargo space and connected to an interrogator 28 internal to the cargo space. The interrogator 28 is connected to an external antenna 30 and can also be connected to a satellite or other communication unit as in FIG. 1. The distances from each antenna 22, 24, 26 to the transceiver device or tag 32 are shown as D1, D2 and D3. The interrogator 28 may be arranged within the triangle defined by the antennas 22, 24, 26 or elsewhere. The variations described for the embodiment shown in FIG. 1 are equally applicable to this embodiment.

Mounting of the antennas 22, 24, 26, or possibly any other type of electromagnetic energy transceiver, on the roof of the shipping container is advantageous in that is it very unlikely to interfere with the maximum use of the cargo space provided by the shipping container.

Figure 3:
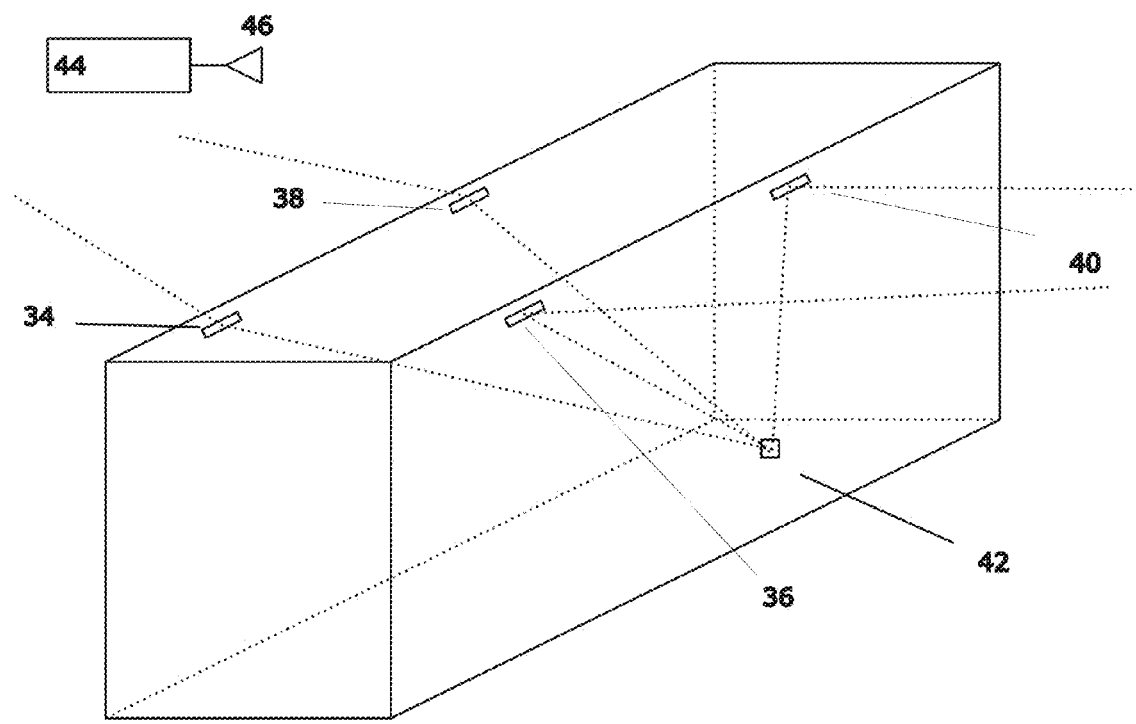
FIG. 3 illustrates an embodiment of a cargo space with RF windows.

FIG. 3 illustrates an embodiment of a shipping container defining a cargo space with multiple RF windows 34, 36, 38, 40 in the frame of the container. The windows 34, 36, 38, 40 allow for the signal to and from one or more transceiver devices or tags 42 in the cargo space to transmit and receive signals from an interrogator 44 such as shown schematically in FIG. 6 which can be located outside of the cargo space. This embodiment therefore enables an interrogator 44 to obtain signals via antenna 46 from a transceiver device or tag 42 within a cargo space while the interrogator 44 is separate and apart from the cargo space. Such RF windows would be needed anytime the frame is interposed between the interrogator and its antenna, and the space defined by the frame. It is thus conceivable that the interrogator and its antenna may even be arranged on the frame yet require one or more RF windows to enable signals from the antenna to pass into the space and return signals from any transceiver devices in the space to pass out of the space to be received by the antenna.

The size, location and number of RF windows in an asset, such as the shipping container defining the cargo space shown in FIG. 3, can vary depending on, for example, the expected and possible locations of transceiver devices or tags in the cargo space or other space defined by the asset, the dimensions of the cargo space or other space defined by the asset, and the expected relative position between the antenna of the interrogator and the transceiver devices. It is possible that one or more RF windows be situated at the same location on a particular type of shipping container and that a scanning system being provided for use with such shipping containers which is designed to accept one or more shipping containers in a position in which the RF windows are automatically properly aligned with an antenna of an interrogator of the scanning system. This will simplify the scanning of the shipping containers.

Figure 4:
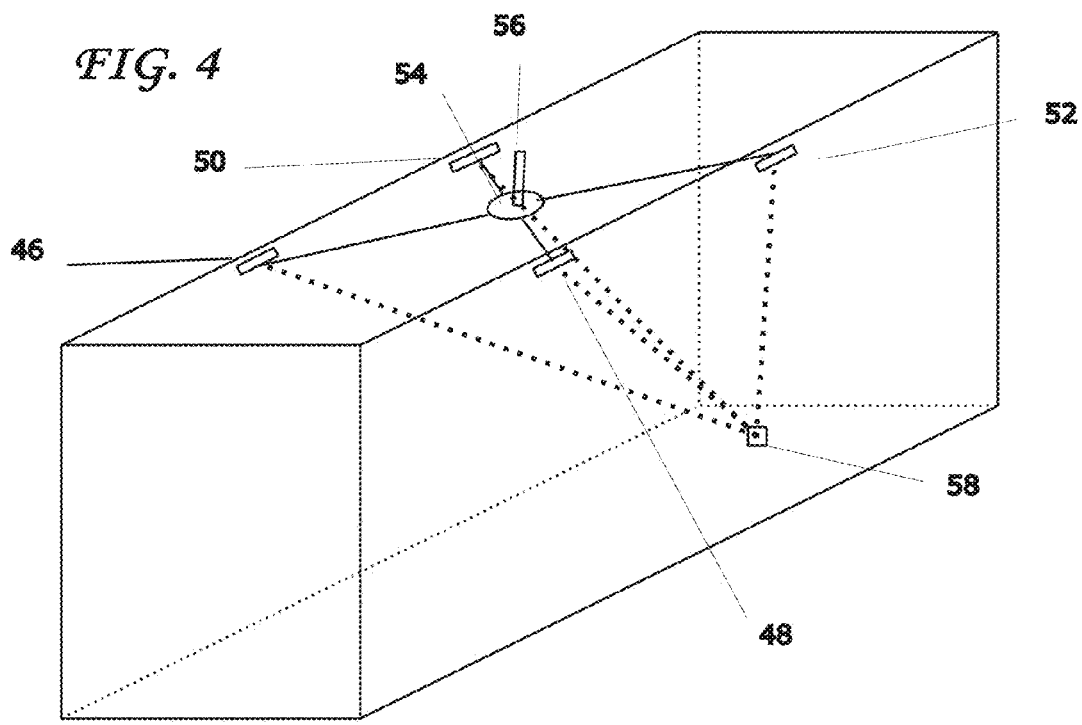
FIG. 4 illustrates an embodiment of a cargo space with an antenna multiplexer arrangement.

FIG. 4 illustrates an embodiment of a cargo space with a multiple of internal antennas 46, 48, 50, 52 connected to an antenna multiplexer 54 (such as a PE4261 SP4T RF UltraCMOS™ Flip Chip Switch manufactured by Peregrine Semiconductor). As shown, antennas 46, 48, 50, 52 are all arranged at the top of the shipping container defining the cargo space.

Figure 6:
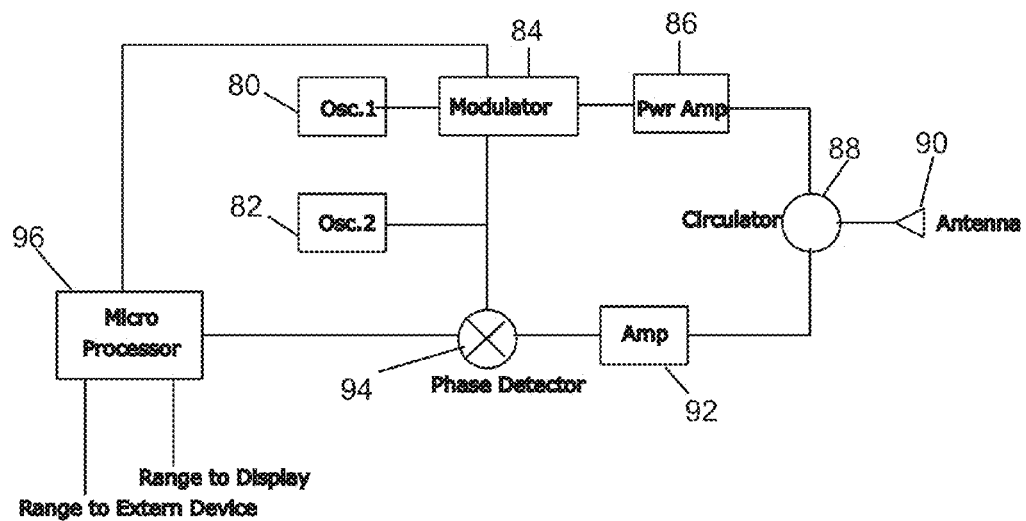
FIGS. 6 and 7 are block diagrams of an interrogator with a single antenna which may be used in the invention.

The multiplexer 54 may be connected to an antenna 56 outside of the cargo space (an external antenna, yet one which is still mounted on or attached to the frame defining the cargo space) for communications with an external interrogator such as illustrated in FIG. 6. A transceiver may be connected between the multiplexer 54 and the external antenna 56 in order to increase the signal strength of the signals from the transceiver device 58 which is internal to the shipping container defining the cargo space. The external antenna 56 is used to communicate with an interrogator and its antenna which is used to control the transmissions of signals by the antennas 46, 48, 50, 52 and process signals received by the antennas into information about the transceiver device 58 or an object on or to which the transceiver device is mounted to attached. A processor may be used for this purpose and may either be part of the interrogator or separate therefrom.

Figure 10:
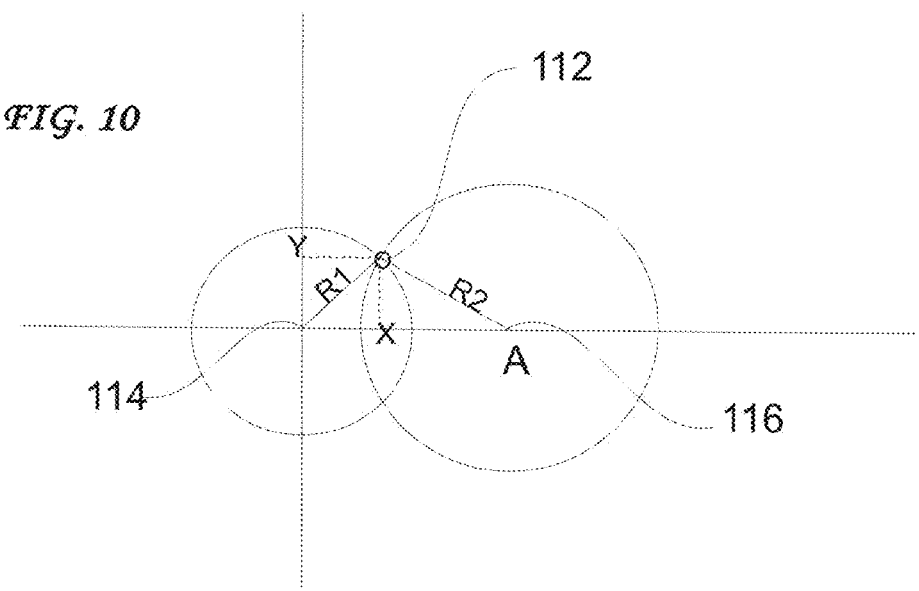
FIG. 10 illustrates a method of using triangulation to determine the location of a tag within a cargo space in accordance with the invention.

The transceiver device location in the cargo space may be determined by measuring the distances from the transceiver device 58 to each of the internal antennas 46, 48, 50, 52 by triangulation as illustrated in FIG. 10 and described below.

Triangulation may be used in the same manner whenever there are at least three antennas which receive signals generated by the presence of a transceiver device in a monitored cargo space.

Figure 5:
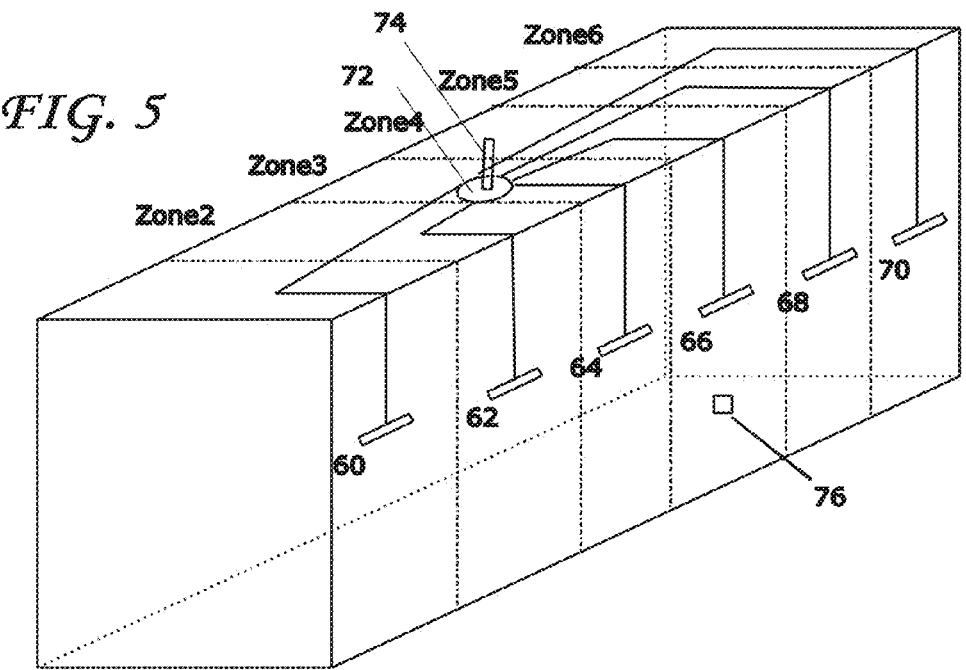
FIG. 5 illustrates an embodiment of a cargo space with multiple antennas which enable the position of a tag to be determined based on reception of signals by the antennas.

FIG. 5 illustrates an embodiment of a cargo space with multiple internal antennas 60, 62, 64, 66, 68, 70 connected to an antenna multiplexer 72 (such as the PE4261). The multiplexer 72 may be connected to an external antenna 74 outside of the cargo space for communications with an external interrogator such as illustrated in FIG. 6. As in the embodiment of FIG. 4, a transceiver may be connected between the multiplexer 72 and the outside antenna 74 for increasing the signal strength of the signals from the transceiver device 76 or transceiver devices which are within the cargo space. The transceiver device location in the cargo space may be determined by measuring the signal strengths from the internal antennas 60, 62, 64, 66, 68, 70, whereby the antenna closest to the transceiver device 76 will have the largest or strongest signal therefore the zone where the transceiver device 76 is located in the cargo space may be determined.

When using multiple antennas on an asset and deriving the general location of area of the transceiver device or transceiver-device equipped object based on the signal strength, the antennas can be distributed or spaced apart along any single dimension of the asset, e.g., longitudinally for the shipping container as shown in FIG. 5. In this manner, the approximate longitudinal location of the transceiver device or object equipped therewith could be determined. Of course, when two antennas provide signals having equal strength, it could be derived that the transceiver device is situated exactly between the antenna locations.

In one embodiment, the antennas are arranged along a longitudinal center line of the cargo space, e.g., down the center of a shipping trailer or container.

FIG. 6 illustrates a block diagram of an interrogator with a single antenna which may be used in the embodiments herein. Information from this interrogator may be displayed locally or sent over a communications link, such as a satellite, cell phone, internet or equivalent link, to a remote location for processing, logging, re-transmission or for any other purpose.

The interrogator 78 includes a pair of oscillators 80, 82, a modulator 84 processing the output from oscillators 80, 82 and providing output to a power amplifier 86, a circulator 88 connected to the power amplifier 86 and providing a signal for transmission by the antenna 90 with a signal being received by antenna 90 being directed through the circulator 88 to an amplifier 92, and a phase detector 94 connected to the oscillator 82, modulator 84 and amplifier 92 and performing a phase comparison between the signals transmitted and received via antenna 90. A microprocessor 96 is coupled to the modulator 84 and phase detector 94 and analyzes the phase comparison to determine information about a transceiver device which returns a signal to the antenna 90. This information may be distance or range information, which may be provided to an external device or a display. Additionally or alternatively, if may be identification information or motion information.

The information may be derived using the known speed of the waves and the time for travel of the waves, since the distance between the antenna and the transceiver-device is equal to one-half the speed multiplied by the total travel time. The frequency can be calculated from the determined time and the range of the phase detector is radians.

FIG. 7 illustrates a block diagram of an interrogator with a single antenna similar to that shown in FIG. 6. Information from this interrogator may be displayed locally or sent over a communications link via a communications device 97 to a remote location as above. This embodiment of an interrogator shows a method for measuring the distance from the interrogator antenna to the antenna of a transceiver device. The modulation used may be either amplitude or frequency; the phase detector may be of the phase/frequency type. An exemplifying calculations for amplitude modulation would involve determining the time for travel of the waves, which is equal to twice the distance between the antenna and the transceiver-device (having a set maximum of 5 meters) divided by the speed of light. The frequency can be calculated from the determined time and the range of the phase detector is radians.

FIG. 8 illustrates a block diagram of an interrogator with multiple antennas which may be used in embodiments herein. The block diagram is similar to that shown in FIG. 6 and the same reference numerals designate the same elements. However, in this embodiment, individual antennas are selected by a MUX 98 (which may be one designated in the field as a PE4261). The MUX 98 controls the transmission and reception of signals via antennas 100, 102, 104. Any number of antennas may be provided, and using the PE4261, up to six antennas may be used. Control of the MUX 98 may be achieved using the microprocessor 96 which is coupled thereto.

Information from this interrogator may be displayed locally or sent over a communications link to a remote location as described above. This embodiment of an interrogator shows a method for measuring the distance from the selected interrogator antenna to a tag antenna. The modulation may be either amplitude or frequency; the phase detector may be of the phase/frequency type. Example calculations are shown for amplitude modulation. By using the distances from the antennas 100, 102, 104 to a tag, the location of the tag can be calculated by triangulation as shown in FIG. 10 and described below.

FIG. 9 illustrates three exemplary methods for deriving or harvesting electrical power for the operation of interrogators, multiplexers and/or transceivers/transmitters, as well as any other electricity consuming devices on the cargo container needed for the operation or purpose of gathering information about a tagged object in the cargo space, whether situated within or in the cargo space or within, in or on the structure defining the cargo space. These include solar panels 106 (shown in the top of the cargo container), a vibration to voltage generator 108 (shown on a side of the container) and a magnetic field variation device 110 which generates electrical power based on variations in a magnetic field caused by movement of the container.

FIG. 10 illustrates a method of using triangulation to determine the location of a typical tag 112 within a cargo space, which may be used in embodiments described herein. The exemplary tag location determination by triangulation is shown for two dimensions in the x, y plane but may be readily extended to a three-dimensional x, y, z space.

Let:
R1=The measured range from Antenna 114 to the tag 112.
R2=The measured range from Antenna 116(a,0) to the tag 112.
a=known distance between antennas $$R1^2 := x^2 + y_2$$

$$y^2 := R1^2 - x^2 \qquad \text{Eq(1)}$$

$$R2^2 := (x+a)^2 + y^2 \qquad \text{Eq(2)}$$

substituting:

$$R2^2 := (x+a)^2 + R1^2 - x^2$$

$$R2^2 - R1^2 := x^2 + 2a \cdot x + a^2 - x^2$$

$$2 \cdot a \cdot x := R2^2 - R1^2 - a^2$$

R1 and R2 are measured values and a is known by the distance between the antennas 114, 116 therefore; x can be computed. Once x is computed y can be found by substituting x into equation 1.

$$x := \frac{(R2^2 - R1^2 - a^2)}{2 \cdot a}$$

The location of the tag 112 in three dimensions can now be easily found by those skilled in the art.

The above analysis has been based on the time of arrival of a signal from a tag at the various antennas. Other methods based on the angle of arrival can permit vectors to be drawn that pass through the tag location and then based on the calculation of the intersection of these vectors, the location of the tag can be found. Information about this technique is disclosed, for example, in Z. Wen, L. Li, and P. Wei "Fast Direction Using Modified Pseudocovariance Matrix", IEEE Transactions on Antennas and Propagation, Vol 54, No. 12, December 2006, and articles referenced therein.

An alternate approach would be for the antennas to send short pulses which all of the tags would hear and record the times of arrival. This recording would then be sent back to the interrogator from which the interrogator circuitry could determine the location of a tag based on the pattern of signals that the tag heard. Each antenna could append an ID so that the tag could record the tag signal correspondence. These techniques can be based on relative times or on absolute time. The latter could be determined by a variety of methods including syncing the clock on each tag with the interrogator clock.

Another method of determining the location of a tag is to enable the tag to either receive or transmit ultrasound. In the latter case, the tag would emit an ultrasonic pulse when it receives an RF pulse and listeners distributed around the cargo space would receive each ultrasonic pulse at a different time and thereby know, or enable a determination of, the distance to the tag. If there are three listeners, then the tag location is known based on the known location of the listeners.

The methods and systems described above for interacting with transceiver devices or tags are equally applicable for other types of tags or responsive devices including but not limited to various SAW devices, resonators and reflectors (e.g., dihedral reflectors), such as disclosed in the applications listed above. The information obtained by the methods and system in accordance with the invention which interact with these devices may be identification information and/or positional information. In the latter case, when tags are installed onto fixed components of assets, such as a seat or door in a vehicle, their presence, positions and/or orientations can be determined and used to control other systems, such as vehicular systems having output which varying as a function of the presence, position and/or orientation of the components (which may correlate to the presence, position and/or orientation of human occupants of the vehicles).

The methods and system in accordance with the invention can be used to interrogate multiple transceiver devices or similar tags. In this case, the identification, location and/or motion of multiple transceiver devices or objects associated therewith can be determined.

In a preferred embodiment, the asset is a vehicle and one or more components are equipped with transceiver devices. The interrogator controls transmission of RF signals from the antennas to cause these transceiver devices to generate return signals. Analysis of these return signals by a processor associated with the interrogator can be used to derive information about the components. In this regard, reference is made to the disclosure of U.S. Pat. No. 6,820,897 which is directed to, among other things, use of resonators arranged on vehicular components.

Additional variations of any of the embodiments of the method and system described above include the ability of the interrogator or antenna multiplexer to transmit signals from the transceiver devices or information derived from the transceiver devices to one or more locations or sites remote from the asset containing the transceiver device. This allows remote monitoring of assets.

The presence of an interrogator on the same frame or structure which defines a space into which transceiver devices or objects equipped with transceiver devices greatly simplifies the ability to scan spaces of these frames or structures. The objects equipped with the transceiver devices may be sensors. In addition, such sensors may be arranged to be independently interrogated by the interrogator which would thus interrogate the transceiver devices and the sensors. These sensors may be temperature, optical, flow, humidity, chemical, biochemical, current, voltage, magnetic field, electric field, force, acceleration, velocity, displacement, a position, vibration, acoustic, radiation, charge, viscosity, density, electrical resistance, electrical impedance, electrical capacitance, electrical inductance and pressure sensors.

The presence and identification of people can be derived using transceiver devices, via analysis of information from transceiver devices mounted to the vehicle's structure such as seats, and then transmitted off of the vehicle. This concept is disclosed in U.S. Pat. No. 5,829,782, along with the presence of tags and tag monitors inside a vehicle.

The methods and systems described above could also be used to determine the location of transceiver devices exterior of a cargo space, yet still within proximity to, on or in a vehicle containing the interrogator.

The power generated by the antennas may be higher in view of the direction of the radio frequency signals into a closed cargo space. In this regard, transmission rules by the FCC may not apply within an enclosed volume with regard to frequencies or power.

The invention is also applicable to the placement of transceiver device on luggage or baggage which is placed on airplanes. In this case, a passenger and others can always locate their baggage, provided they have an interrogator or an interrogator is used to determine the location of each passenger's luggage. The system can thus detect and locate luggage and baggage, or other objects, after it is in a vehicle equipped with an interrogator.

Another feature of the invention is the use of smart antennas and a single interrogator or reader for use in determining the location of a transceiver device or object equipped therewith. Ideally, the method and system would use minimal energy to achieve this location-determination.

The transceiver devices in any of the embodiments herein may utilize and a transceiver switch, or other techniques, to limit transmissions. MIR may be used to interrogate the transceiver devices.

In one embodiment, transmission via the antennas is based on the location of the antennas. Thus, the interrogator can control the antennas to transmit as a function of the location which is known to the interrogator, or the processor which controls the interrogator.

For a transceiver device or other device which can transmit or generate a return signal at two or more frequencies, it is conceivable that the distance to the transceiver device from the antenna can be determined applying a known phase relationship. With multiple antennas, the ability of a transceiver device to transmit at two or more frequencies can be used to remove integer ambiguity and thereby get a more accurate distance measurement.

Since the best position to place antennas on a shipping container or frame of another asset including an interior, object-receiving space, is not always known in advance, a process can be implemented to find the best location for the antennas. This process may entail arranging a large number of antennas on the asset and conducting tests to determining the position of transceiver devices in the space. Antennas are removed in stages and more tests conducted until the optimum number and position of antennas for the space which provides an acceptable accuracy is determined.

Transceiver devices can be used in combination with SAW devices and other wireless sensors. Many sensors are now in vehicles and many more will be installed in vehicles. The following disclosure is primarily concerned with wireless sensors which can be based on MEMS, SAW and/or transceiver technologies. Vehicle sensors include tire pressure, temperature and acceleration monitoring sensors; weight or load measuring sensors; switches; vehicle temperature, acceleration, angular position, angular rate, angular acceleration sensors; proximity; rollover; occupant presence; humidity; presence of fluids or gases; strain; road condition and friction, chemical sensors and other similar sensors providing information to a vehicle system, vehicle operator or external site. The sensors can provide information about the vehicle and/or its interior or exterior environment, about individual components, systems, vehicle occupants, subsystems, and/or about the roadway, ambient atmosphere, travel conditions and external objects.

For wireless sensors, one or more interrogators can be used each having one or more antennas that transmit energy at radio frequency, or other electromagnetic frequencies, to the sensors and receive modulated frequency signals from the sensors containing sensor and/or identification information. One interrogator can be used for sensing multiple switches or other devices. For example, an interrogator may transmit a chirp form of energy at 905 MHz to 925 MHz to a variety of sensors located within and/or in the vicinity of the vehicle. These sensors may be of the transceiver electronic type and/or of the surface acoustic wave (SAW) type or a combination thereof. In the electronic type, information can be returned immediately to the interrogator in the form of a modulated backscatter RF signal. In the case of SAW devices, the information can be returned after a delay. transceiver tags may also exhibit a delay due to the charging of the energy storage device. One sensor can respond in both the electronic (either transceiver or backscatter) and SAW-delayed modes.

When multiple sensors are interrogated using the same technology, the returned signals from the various sensors can be time, code, space or frequency multiplexed. For example, for the case of the SAW technology, each sensor can be provided with a different delay or a different code. Alternately, each sensor can be designed to respond only to a single frequency or several frequencies. The radio frequency can be amplitude, code or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based or transceiver-based switch, for example, the returned signal may indicate that the switch is either on or off or, in some cases, an intermediate state can be provided signifying that a light should be dimmed, rather than or on or off, for example. Alternately or additionally, a transceiver based switch can be associated with a sensor and turned on or off based on an identification code or a frequency sent from the interrogator permitting a particular sensor or class of sensors to be selected.

SAW devices have been used for sensing many parameters including devices for chemical and biological sensing and materials characterization in both the gas and liquid phase. They also are used for measuring pressure, strain, temperature, acceleration, angular rate and other physical states of the environment.

Economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers can be located outside of the vehicle passenger compartment. For many other transducers to be sensed the antennas can be located at various positions within passenger compartment. At least one invention herein contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems. As described in U.S. Pat. Nos. 4,096,740, 4,623,813, 5,585,571, 5,663,531, 5,821,425 and 5,910,647 and International Publication No. WO 00/65320(A1), SAW devices are appropriate candidates for such weight measurement systems, although in some cases transceiver systems can also be used with an associated sensor such as a strain gage. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW or other strain device can be mounted to the center unthreaded section of the stud and the stud can be attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud other than for an antenna.

In use, the interrogator transmits a radio frequency pulse at, for example, 925 MHz that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors could be used. Since the individual SAW devices are very small, multiple devices can be placed on a stud to provide multiple redundant measurements, or permit bending and twisting strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW or transceiver transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation can be considerably higher than that of the tire monitor, for example. However, if the seat is unoccupied, then the frequency of interrogation can be substantially reduced. For an occupied seat, information as to the identity and/or category and position of an occupying item of the seat can be obtained through the multiple weight sensors described. For this reason, and due to the fact that during the pre-crash event, the position of an occupying item of the seat may be changing rapidly, interrogations as frequently as once every 10 milliseconds or faster can be desirable. This would also enable a distribution of the weight being applied to the seat to be obtained which provides an estimation of the center of pressure and thus the position of the object occupying the seat. Using pattern recognition technology, e.g., a trained neural network, sensor fusion, fuzzy logic, etc., an identification of the object can be ascertained based on the determined weight and/or determined weight distribution.

There are many other methods by which SAW devices can be used to determine the weight and/or weight distribution of an occupying item other than the method described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 6,242,701 (which discloses multiple strain gage geometries) using SAW strain-measuring devices can also be constructed, e.g., any of the multiple strain gage geometries shown therein.

Generally there is a transceiver implementation that corresponds to each SAW implementation. Therefore, where SAW is used herein the equivalent transceiver design will also be meant where appropriate.

Although a preferred method for using the invention is to interrogate each SAW device using wireless mechanisms, in some cases, it may be desirable to supply power to and/or obtain information from one or more of the SAW devices using wires. As such, the wires would be an optional feature.

One advantage of the weight sensors of this invention along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of 16 such gages. If the seat is supported by three legs, then this can be reduced to 12 gages. A three-legged support is preferable to four since with four legs, the seat support is over-determined which severely complicates the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three, provided a good model of the seat structure is available. Unfortunately, this is usually not the case and most seats have four supports and the attachments to the vehicle not only introduce bending moments into the structure but these moments vary from one position to another and with temperature. The SAW strain gages of this invention lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

An additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be more accurate than wire strain gage systems.

A strain detector in accordance with this invention can convert mechanical strain to variations in electrical signal frequency with a large dynamic range and high accuracy even for very small displacements. The frequency variation is produced through use of a surface acoustic wave (SAW) delay line as the frequency control element of an oscillator. A SAW delay line comprises a transducer deposited on a piezoelectric material such as quartz or lithium niobate which is arranged so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored and thus the weight applied to the seat. A SAW strain transducer can be more accurate than a conventional resistive strain gage.

Other applications of weight measuring systems for an automobile include measuring the weight of the fuel tank or other containers of fluid to determine the quantity of fluid contained therein.

One problem with SAW devices is that if they are designed to operate at the GHz frequency, the feature sizes become exceedingly small and the devices are difficult to manufacture, although techniques are now available for making SAW devices in the tens of GHz range. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the high GHz range which is modulated at the hundred MHz range. At the SAW transducer, the transducer is tuned to the modulated frequency. Using a nonlinear device such as a Shocky diode, the modified signal can be mixed with the incoming high frequency signal and re-transmitted through the same antenna. For this case, the interrogator can continuously broadcast the carrier frequency.

Devices based on transceiver or SAW technology can be used as switches in a vehicle as described in U.S. Pat. Nos. 6,078,252, 6,144,288 and 6,748,797. There are many ways that this can be accomplished. A switch can be used to connect an antenna to either a transceiver electronic device or to a SAW device. This requires contacts to be closed by the switch activation. An alternate approach is to use pressure from an occupant's finger, for example, to alter the properties of the acoustic wave on the SAW material much as in a SAW touch screen. The properties that can be modified include the amplitude of the acoustic wave, and its phase, and/or the time delay or an external impedance connected to one of the SAW reflectors as disclosed in U.S. Pat. No. 6,084,503. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. Since wires and connectors are the cause of most warranty repairs in an automobile, not only is the cost of switches substantially reduced but also the reliability of the vehicle electrical system is substantially improved.

Figure 11:
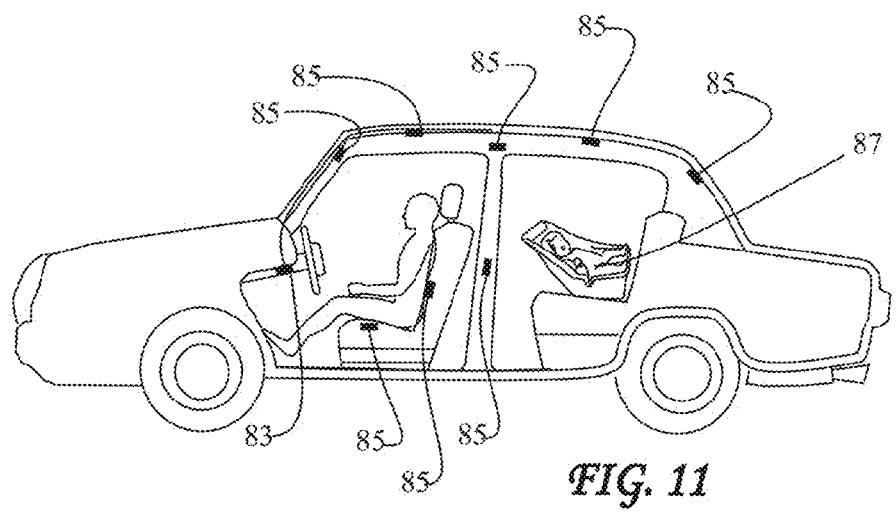
FIG. 11 is a cutaway view of a vehicle showing possible mounting locations for vehicle interior temperature, humidity, carbon dioxide, carbon monoxide, alcohol or other chemical or physical property measuring sensors.

FIG. 11 illustrates a vehicle passenger compartment, and the engine compartment, with multiple SAW or transceiver temperature sensors 85. SAW temperature sensors can be distributed throughout the passenger compartment, such as on the A-pillar, on the B-pillar, on the steering wheel, on the seat, on the ceiling, on the headliner, and on the windshield, rear and side windows and generally in the engine compartment. These sensors, which can be independently coded with different IDs and/or different delays, can provide an accurate measurement of the temperature distribution within the vehicle interior. transceiver switches can also be used to isolate one device from another. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics, then the temperature measurement system can be used to correct the ultrasonic occupant sensor system for the speed of sound within the passenger compartment. Without such a correction, the error in the sensing system can be as large as about 20 percent.

The SAW temperature sensors 85 provide the temperature at their mounting location to a processor unit 83 via an interrogator with the processor unit 83 including appropriate control algorithms for controlling the heating and air conditioning system based on the detected temperatures. The processor unit 83 can control, e.g., which vents in the vehicle are open and closed, the flow rate through vents and the temperature of air passing through the vents. In general, the processor unit 83 can control whatever adjustable components are present or form part of the heating and air conditioning system.

All of the elements of the system which adjusts or controls the vehicle components in any of the embodiments described herein, i.e., the sensors, processing unit and reactive system which is controlled by the processing unit based on the data sensed by the sensors, can be arranged within the vehicle. They could be fixed to the frame of the vehicle, and/or arranged in an interior defined by the frame, with the sensor assemblies (the sensor and wireless transmission component associated therewith) fixed relative to the processor unit or receiver which contains the antenna capable of receiving the signals being transmitted wirelessly from the wireless transmission component of the sensor assemblies. In some embodiments, the sensor assemblies are arranged on parts of the vehicle which are not fixed to the frame or fixed relative to the processor unit or receiver, such as on the tires, but in other embodiments, the sensor assemblies are arranged only on parts fixed to the frame. This fixed relationship between the sensor assemblies and the receiver(s) associated with the processing unit allows for proper positioning of the receivers to communicate with all designated sensor assemblies.

In FIG. 11, a child seat 87 is illustrated on the rear vehicle seat. The child seat 87 can be fabricated with one or more transceiver tags or SAW tags (not shown). The transceiver and SAW tag(s) can be constructed to provide information on the occupancy of the child seat, i.e., whether a child is present, based on the weight, temperature, and/or any other measurable parameter. Also, the mere transmission of waves from the transceiver or SAW tag(s) on the child seat 87 would be indicative of the presence of a child seat. The transceiver and SAW tag(s) can also be constructed to provide information about the orientation of the child seat 87, i.e., whether it is facing rearward or forward. Such information about the presence and occupancy of the child seat and its orientation can be used in the control of vehicular systems, such as the vehicle airbag system or heating or air conditioning system, especially useful when a child is left in a vehicle. In this case, a processor would control the airbag or HVAC system and would receive information from the transceiver and SAW tag(s) via an interrogator.

Figure 12:
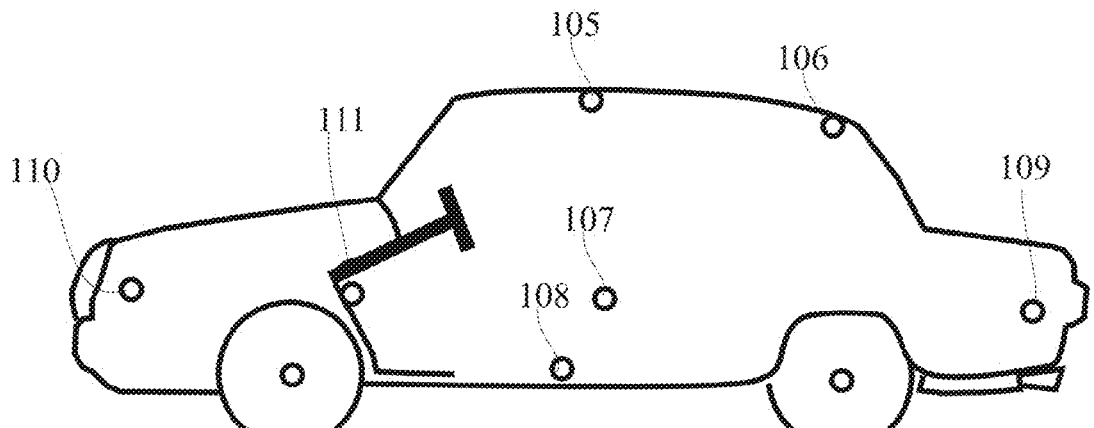
FIG. 12 is a schematic of a vehicle with several accelerometers and/or gyroscopes at preferred locations in the vehicle.

FIG. 12 illustrates the placement of a variety of sensors, primarily accelerometers and/or gyroscopes, which can be used to diagnose the state of the vehicle itself. Sensor 105 can be located in the headliner or attached to the vehicle roof above the side door. Typically, there can be two such sensors one on either side of the vehicle. Sensor 106 is shown in a typical mounting location midway between the sides of the vehicle attached to or near the vehicle roof above the rear window. Sensor 109 is shown in a typical mounting location in the vehicle trunk adjacent the rear of the vehicle. One, two or three such sensors can be used depending on the application. If three such sensors are used, preferably one would be adjacent each side of vehicle and one in the center. Sensor 107 is shown in a typical mounting location in the vehicle door and sensor 108 is shown in a typical mounting location on the sill or floor below the door. Sensor 110, which can be also multiple sensors, is shown in a typical mounting location forward in the crush zone of the vehicle. Finally, sensor 111 can measure the acceleration of the firewall or instrument panel and is located thereon generally midway between the two sides of the vehicle. If three such sensors are used, one would be adjacent each vehicle side and one in the center. An IMU would serve basically the same functions.

In general, sensors 105-111 provide a measurement of the state of the vehicle, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 105-111 above is merely exemplary and is not intended to limit the form of the sensor or its function. Thus, these sensors may or may not be SAW or transceiver sensors and may be powered or unpowered and may transmit their information through a wire harness, a safety or other bus or wirelessly.

Each sensor 105-111 may be single axis, double axis or triaxial accelerometers and/or gyroscopes typically of the MEMS type. One or more can be IMUs. These sensors 105-111 can either be wired to the central control module or processor directly wherein they would receive power and transmit information, or they could be connected onto the vehicle bus or, in some cases, using transceiver, SAW or similar technology, the sensors can be wireless and would receive their power through RF from one or more interrogators located in the vehicle. In this case, the interrogators can be connected either to the vehicle bus or directly to control module. Alternately, an inductive or capacitive power and/or information transfer system can be used.

Figure 13:
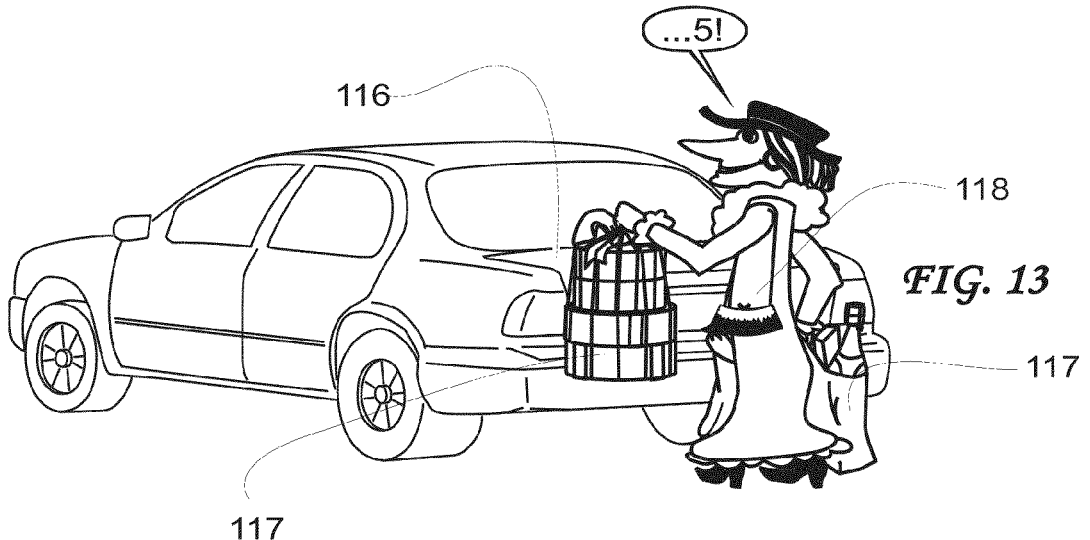
FIG. 13 illustrates a driver with a timed transceiver standing with groceries by a closed trunk.
Figure 14:
FIG. 14 illustrates the driver with the timed transceiver 5 seconds after the trunk has been opened.

The driver can be provided with a keyless entry device, other transceiver tag, smart card or cell phone with an RF transponder that can be powerless in the form of a transceiver or similar device, which can also be boosted as described herein. Generally, such keyless entry devices can be considered a portable identification device. The interrogator, or a processing unit associated therewith, determines the proximity of the driver to the vehicle door or other similar object such as a building or house door or vehicle trunk. As shown in FIG. 13, if a driver 118 remains within a certain distance, 1 meter for example, from the door or trunk lid 116, for example, for a certain time period such as 5 seconds, then the door or trunk lid 116 can automatically unlock and ever open in some implementations. The distance and time period can be selected or determined as desired. Thus, as the driver 118 approaches the trunk with his or her arms filled with packages 117 and pauses, the trunk can automatically open (see FIG. 14). Such a system would be especially valuable for older people. This system can also be used for other systems in addition to vehicle doors and trunk lids.

Figure 15:
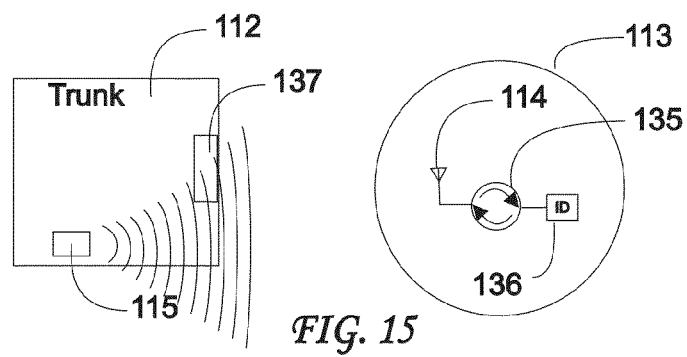
FIG. 15 illustrates a trunk opening arrangement for a vehicle in accordance with the invention.

As shown in FIG. 15, an interrogator 115 is placed on the vehicle, e.g., in the trunk 112 as shown, and transmits waves. When the keyless entry device 113, which contains an antenna 114 and a circuit including a circulator 135 and a memory containing a unique ID code 136, is a set distance from the interrogator 115 for a certain duration of time, the interrogator 115 directs a trunk opening device 137 to open the trunk lid 116. The duration of time is determined from the continuous reception by the interrogator 115 of the ID code 136 from the keyless entry device 113.

Figure 16A:
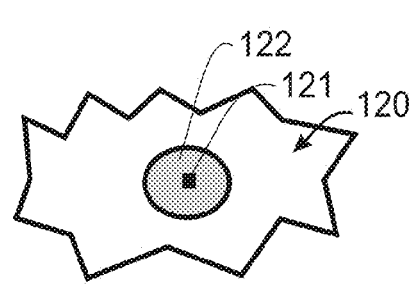
FIG. 16A is a view of a SAW switch sensor for mounting on or within a surface such as a vehicle armrest.
Figure 16B:
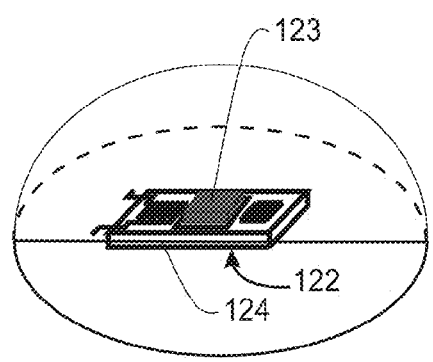
FIG. 16B is a perspective view of the device of FIG. 16A with the force-transmitting member rendered transparent.

A SAW device can also be used as a wireless switch as shown in FIGS. 16A and 16B. FIG. 16A illustrates a surface 120 containing a projection 122 on top of a SAW device 121. Surface material 120 could be, for example, the armrest of an automobile, the steering wheel airbag cover, or any other surface within the passenger compartment of an automobile or elsewhere. Projection 122 will typically be a material capable of transmitting force to the surface of SAW device 121. As shown in FIG. 16B, a projection 123 may be placed on top of the SAW device 124. This projection 123 permits force exerted on the projection 122 to create a pressure on the SAW device 124. This increased pressure changes the time delay or natural frequency of the SAW wave traveling on the surface of material. Alternately, it can affect the magnitude of the returned signal. The projection 123 is typically held slightly out of contact with the surface until forced into contact with it.

Figure 16C:
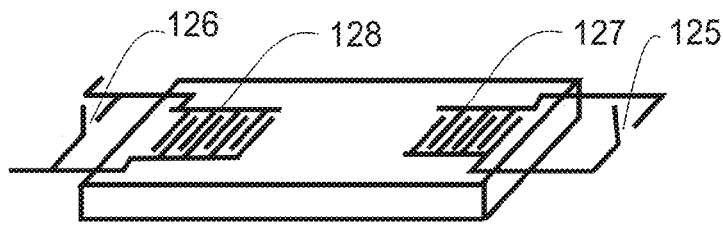
FIG. 16C is a perspective view of an alternate SAW device for use in FIGS. 16A and 16B showing the use of one of two possible switches, one that activates the SAW and the other that suppresses the SAW.

An alternate approach is to place a switch across the IDT 127 as shown in FIG. 16C. If switch 125 is open, then the device will not return a signal to the interrogator. If it is closed, than the IDT 127 will act as a reflector sending a signal back to IDT 128 and thus to the interrogator. Alternately, a switch 126 can be placed across the SAW device. In this case, a switch closure shorts the SAW device and no signal is returned to the interrogator. For the embodiment of FIG. 16C, using switch 126 instead of switch 125, a standard reflector IDT would be used in place of the IDT 127.

Figure 16D:
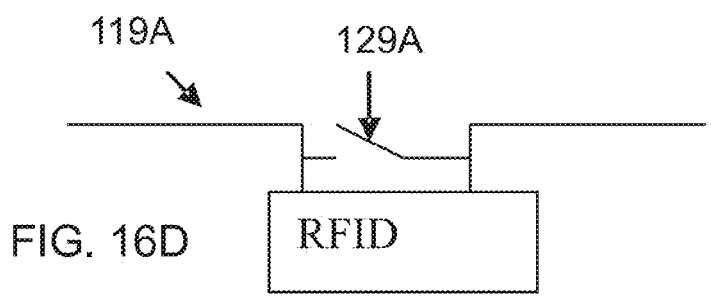
FIG. 16D is a schematic of a transceiver controlled by a switch.

FIG. 16D shows an embodiment wherein a radio-frequency identification device (transceiver) is controlled by a switch 129A, and may be one of the wireless transmission components of a switch assembly. The switch 129A may be a conventional, mechanical switch such as a push button, toggle and the like. A switch assembly would therefore comprise the transceiver, the switch 129A and an antenna 119A which may constitute another wireless transmission component. In this case, when the user presses on an exposed surface of the passenger compartment, he or she would close the switch 129A and thereby short the transceiver so that it would be inoperative. That is, the transceiver would not respond when interrogated. Instead of a switch, a variable impedance could also be provided which would modify the output of the transceiver based on the magnitude of pressure to the exposed surface. Instead of using the switch or variable impedance, another control mechanism for causing variation in the transmission by the wireless transmission components of the switch assembly can be provided. In this embodiment, as well as the other embodiments herein wherein a transceiver is provided, the transceiver can be either a passive transceiver or an active transceiver. In the latter case, the transceiver is supplied with power from a power source on the vehicle, such as the vehicle's battery, a local battery, photo cell, or a local energy generator or harvester.

FIGS. 16C and 16D are examples of manually activated transceiver switch assemblies which could be used in a vehicular component control system to adjust various components based on user action. For example, each switch assembly could control a respective component with a processor unit of the control system being coupled to or included within an interrogator arranged to transmit RF signals having identification data associated with the transceiver switch assemblies such that upon transmission of each RF signal, any transceiver switch assemblies with matching identification data would be capable of providing responsive signals. In particular, the transceiver switch assemblies provide output based on pressure applied by the occupant of the vehicle to an exposed surface and includes an RF transmission component arranged to wirelessly transmit an indication of the application of pressure to the exposed surface. This indication may be the magnitude of the pressure being applied (e.g., via the switch assembly of FIG. 16C) or the absence of a signal (e.g., via the short-circuited transceiver of FIG. 16D). Other input devices for use in the same component control system include those described elsewhere herein, for example, a transceiver assembly including a sensor and a transceiver switch which could receive an RF signal from the same interrogator and upon receipt of a signal containing its identification, enable transmission of a signal from the sensor from which a property being monitored by the sensor is determinable. Another input device is a transceiver assembly including a sensor and a transceiver switch which is arranged to receive an RF signal from the same interrogator and upon receipt of a signal not containing its identification, disable transmission of an RF signal from the interrogator to the sensor for its excitation, from which sensor a property being monitored by the sensor is determinable.

FIG. 16H shows another switch assembly for controlling a component which includes an energy storage and/or transmission component 443 which may comprise a transceiver so that when the switch assembly is activated, the transceiver 443 is able to respond to an interrogation signal from an interrogator associated with the component control system. The transceiver switch assembly includes a piezoelectric energy generator switch 441 underlying an exposed surface 440 of the vehicle and formed by a plurality of sheets of a piezoelectric material, such as polyvinylidene fluoride (PVDF), and generates power upon application of pressure to the exposed surface 440. The generated power is usable to power the transmission component, i.e., the transceiver. The stack of PVDF sheets are placed over supports 442 and can include a snap action mechanism, not shown, to provide a snap action switch.

PVDF is a known inexpensive material capable of use in vehicles. PVDF is also usable as a SAW-type device and would be especially applicable where there is external power provided. The presence of available energy could lead to certain advantages of the use of PVDF such as for chemical sensing since it could be much larger than other sensing equivalents, such as lithium Niobate, and therefore more likely to capture the chemical. As an energy generator, PVDF has much more applicability since a number of layers can be stacked thereby multiplying its energy output. The switch shown in FIG. 16H can be made, for example, so that it gets its power from someone snapping the stack of PVDF sheets 441 between supports 442 in a snap action switch. The power generated could send a signal to a receiver or alternatively, it could be used to power the transceiver 443 thereby giving an ID transmission relating to the switching action which is indicative of a desired action by the occupant of the vehicle and thus could be used to control an adjustable component.

Figure 16E:
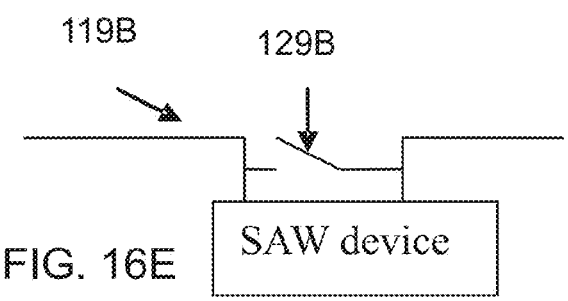
FIG. 16E is a schematic of a SAW device controlled by a switch.

FIG. 16E shows an embodiment wherein a surface-acoustic-wave (SAW) device is controlled by a switch 129B, and may be one of the wireless transmission components of a switch assembly. The switch 129B may be a conventional, mechanical switch such as a push button, toggle and the like. A switch assembly would therefore comprise the SAW device, the switch 129B and an antenna 119B which may constitute another a wireless transmission component. In this case, when the user presses on an exposed surface of the passenger compartment, he or she would close the switch 129B and thereby prevent the SAW device from receiving a signal so that it would be inoperative. Instead of a switch, a variable impedance could also be provided which would modify the output of the SAW device based on the magnitude of pressure to the exposed surface. Instead of using the switch or variable impedance, another control mechanism for causing variation in the transmission buy the wireless transmission components of the switch assembly can be provided. In this embodiment, as well as the other embodiments herein wherein a SAW device is provided, the SAW device can be either a passive SAW device or an active SAW device. In the latter case, the SAW device is supplied with power from a power source on the vehicle, such as the vehicle's battery, a local battery or a local energy generator or harvester.

A variable impedance is used as the control mechanism for situations when variations in the operation of a vehicular component are desired. For example, if a light is capable of being dimmed, then the variable impedance would be useful to control the dimming of the light. It is also useful to control adjustment of the volume of a sound system in the vehicle, as well as other analogue functions.

Figure 16F:
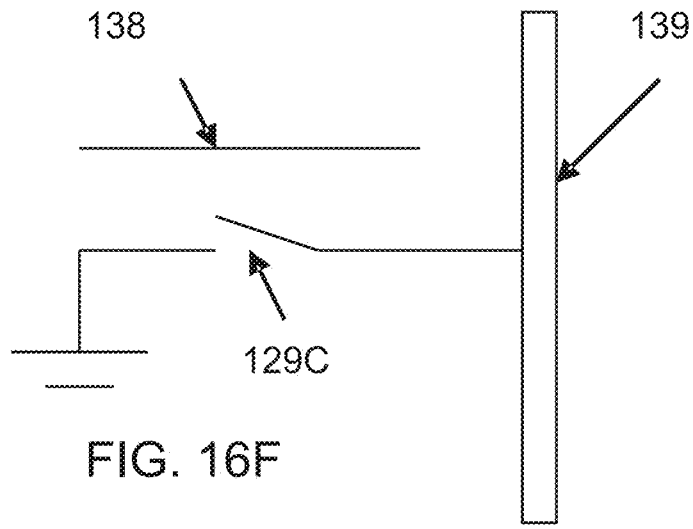
FIG. 16F is a schematic of a backscatter antenna which is controlled by a switch.

Referring now to FIG. 16F, another embodiment of the invention using a control mechanism, i.e., a switch or variable impedance, is an antenna 139 capable of reflecting an interrogating signal, and even which slightly modifies the interrogating signal (reflection from such an antenna being termed backscatter). The modification to the interrogating signal can be correlated to the desired manner for controlling the vehicular component. In this case, a lead is connected to an intermediate location on the antenna 139, e.g., the middle of the antenna 139, and a switch or variable impedance (a switch 129C is shown) is placed between the lead and ground. In the embodiment having a switch 129C, when the switch 129C is open, the antenna 139 will reflect at a particular frequency based on its length (for a simple dipole antenna). When the switch 129C is closed by the application of pressure to the exposed surface 138 of the passenger compartment, the antenna 139 will short and thereby effectively reduce the length of the antenna 139 and alter the resonant frequency of the antenna 139. A lead placed at the middle of the antenna 139 would, when connected to a closed switch 129C leading to ground, cause the resonant frequency to approximately double. In the embodiment having variable impedance, the antenna would be provided with a variable effect depending on the pressure exerted on the exposed surface or otherwise controlling the variable impedance.

Figure 16G:
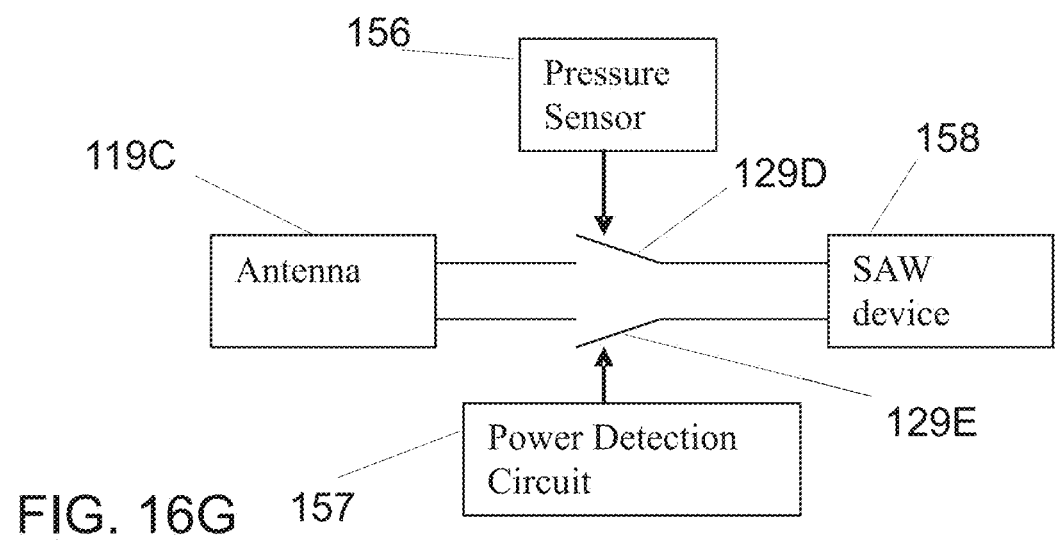
FIG. 16G is a schematic of circuit for a monitoring system in accordance with the invention which has two switches.

Referring now to FIG. 16G, in another embodiment of a SAW sensor assembly in accordance with the invention, the circuit of the SAW sensor assembly has both an active mode and a passive mode depending on the presence of sufficient power in the energy storage device and whether the substrate to which the SAW sensor assembly is associated with is moving and thereby generates energy (for example, the energy may be generated using the power generating system described with reference to FIG. 9 herein and FIGS. 36, 36A and 98 of U.S. patent application Ser. No. 11/681,834 incorporated by reference herein). That is, the SAW sensor assembly circuit is provided with a passive mode, which is used when power is not provided to the SAW device 158 by either an energy harvester or energy generating system and the substrate (tire) is not moving, and an active mode when power is provided or available to the SAW device 158, e.g., provided by an energy harvester or energy generating system upon rotation of the tire or from an energy storage device. In the active mode (when the tire is rotating or there is sufficient power in the energy storage device to power the SAW device 158), a power detection circuit 157 detects power and closes a switch 129E thereby connecting the SAW device 158 to the antenna 119C. Power detection circuit 157 may be integrated into the SAW sensor assembly circuit so that whenever there is sufficient power being generated or available, the switch 129E is automatically closed. On the other hand, when energy for the SAW device 158 is not provided by an energy storage device and the tire is not rotating, switch 129E is open so as to avoid providing unnecessary signals from the SAW device 158 to the interrogator via the antenna 119C, the interrogator being used to obtain the signals from the SAW device 158 and process them into a meaningful reading of whatever property or properties is/are being monitored by the SAW device 158. However, since it is desirable to provide signals from the SAW device 158 for certain conditions of the property being monitored by the SAW device 158, e.g., the property is below a threshold, a sensor 156 is provided and controls a second switch 129D between the antenna 119C and the SAW device 158. Sensor 156 is designed to close the switch when one or more conditions relating to the property are satisfied to thereby enable a transmission from the antenna 119C to the SAW device 158 and a modified signal to be provided from the SAW device 158 to the antenna 119C for transmission to the interrogator.

For example, if sensor 156 is a pressure sensor and SAW assembly is being used to monitor tire pressure, then when the pressure is below a threshold as detected by sensor 156, switch 129D is closed and thereby allows the SAW device 158 to provide a modified signal. Sensor 156 should ideally be a sensor that does not require power (or requires minimal power) and can continually monitor the property, for example, a pressure sensing diaphragm could be used to and positioned relative to the switch 129D so that when the pressure is below a threshold, the diaphragm moves and causes closure of the switch 129D. Indeed, the switch 129D could even be attached to such a pressure sensing diaphragm. In this case, when the pressure is at or above the threshold, the pressure sensing diaphragm does not close switch 129D thereby conserving power. Switch 129D would therefore be in an open position whenever the pressure was at or above the design threshold. Instead of a fixed threshold, a variable threshold can be used based on any number of factors. Also, a temperature sensor could be used to close a switch if temperature is being monitored, e.g., a diaphragm which expands with temperature could be attached to the switch 129D or another thermal or temperature switch used in the circuit. Any other type of sensor which changes its state or condition and can cause closure of a switch based on a predetermined threshold, or switch which is activated based on a sensed property of the tire, could also be used in the invention.

The minimal transmission from the SAW device 158 is necessary in particular in a case where only one tire has a low pressure. One reason for this is because it is difficult to separate transmissions from more than one tire when operating in the passive mode.

Any of the disclosed applications can be interrogated by the central interrogator of this invention and can either be powered or operated powerlessly as described in general above. Block diagrams of three interrogators suitable for use in this invention are illustrated in FIGS. 19A-19C of the '834 application. FIG. 19A illustrates a super heterodyne circuit and FIG. 19B illustrates a dual super heterodyne circuit. FIG. 19C operates as follows. During the burst time two frequencies, F1 and F1+F2, are sent by the transceiver after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

As discussed elsewhere herein, the particular tire that is sending a signal can be determined if multiple antennas, such as three, each receive the signal. For a 500 MHz signal, for example, the wave length is about 60 cm. If the distance from a tire transceiver to each of three antennas is on the order of one meter, then the relative distance from each antenna to the transceiver can be determined to within a few centimeters and thus the location of the transceiver can be found by triangulation. If that location is not a possible location for a tire transceiver, then the data can be ignored thus solving the problem of a transceiver from an adjacent vehicle being read by the wrong vehicle interrogator. This will be discussed below with regard to solving the problem of a truck having 18 tires that all need to be monitored. Note also, each antenna can have associated with it some simple circuitry that permits it to receive a signal, amplify it, change its frequency and retransmit it either through a wire of through the air to the interrogator thus eliminating the need for long and expensive coax cables.

One aspect of at least one of the inventions disclosed herein is the use of an interrogator to wirelessly interrogate multiple sensing devices thereby reducing the cost of the system since such sensors are in general inexpensive compared to the interrogator. The sensing devices are preferably based on SAW and/or transceiver technologies although other technologies are applicable.

Antenna Considerations

Antennas are a very important aspect to SAW and transceiver wireless devices such as can be used in tire monitors, seat monitors, weight sensors, child seat monitors, fluid level sensors and similar devices or sensors which monitor, detect, measure, determine or derive physical properties or characteristics of a component in or on the vehicle or of an area near the vehicle. In many cases, the location of a SAW or transceiver device needs to be determined such as when a device is used to locate the position of a movable item in or on a vehicle such as a seat. In other cases, the particular device from a plurality of similar devices, such as a tire pressure and/or temperature monitor that is reporting, needs to be identified. Thus, a combination of antennas can be used and the time or arrival, angle of arrival, multipath signature or similar method used to identify the reporting device. One preferred method is derived from the theory of smart antennas whereby the signals from multiple antennas are combined to improve the signal-to-noise ratio of the incoming or outgoing signal in the presence of multipath effects, for example.

Additionally, since the signal level from a SAW or transceiver device is frequently low, various techniques can be used to improve the signal-to-noise ratio as described below. Finally, at the frequencies frequently used such as 433 MHz, the antennas can become large and methods are needed to reduce their size. These and other antenna considerations that can be used to improve the operation of SAW, transceiver and similar wireless devices are described below.

Tire Information Determination

One method of maintaining a single central antenna assembly while interrogating all four tires on a conventional automobile, is illustrated in FIGS. 17 and 18. The same technique may be used in the invention when interrogating multiple components, transceiver devices or transceiver-equipped objects as disclosed herein.

An additional antenna can be located near the spare tire, which is not shown. It should be noted that the system described below is equally applicable for vehicles with more than four tires such as trucks.

A vehicle body is illustrated as 620 having four tires 621 and a centrally mounted four element, switchable directional antenna array 622. The four beams are shown schematically as 623 with an inactivated beam as 624 and the activated beam as 625. The road surface 626 supports the vehicle. An electronic control circuit, not shown, which may reside inside the antenna array housing 622 or elsewhere, alternately switches each of the four antennas of the array 622 which then sequentially, or in some other pattern, send RF signals to each of the four tires 621 and wait for the response from the transceiver, SAW or similar tire pressure, temperature, ID, acceleration and/or other property monitor arranged in connection with or associated with the tire 621. This represents a time domain multiple access system.

The interrogator makes sequential interrogation of wheels as follows:

Stage 1. Interrogator radiates 8 RF pulses via the first RF port directed to the 1st wheel.
Pulse duration is about 0.8 μs.
Pulse repetition period is about 40 μs.
Pulse amplitude is about 8 V (peak to peak)
Carrier frequency is about 426.00 MHz.
(Between adjacent pulses, the receiver opens its input and receives four-pulses echoes from the transponder located in the first wheel).
Then, during a time of about 8 ms, the internal micro controller processes and stores received data.
Total duration of this stage is 32 μs+8 ms=8.032 ms.

Stage 2, 3, 4. Interrogator repeats operations as on stage 1 for $2^{nd}, 3^{rd}$ and $4^{th}$ wheel sequentially via appropriate RF ports.

Stage 5. Interrogator stops radiating RF pulses and transfers data stored during stages 1-4 to the external PC for final processing and displaying. Then it returns to stage 1. The time interval for data transfer equals about 35 ms.

Some notes relative to FCC Regulations:
The total duration of interrogation cycle of four wheels is 8.032 ms*4+35 ms=67.12 ms.

During this time, interrogator radiates 8*4=32 pulses, each of 0.8 μs duration.

Thus, average period of pulse repetition is 67.12 ms/32=2.09 ms=2090 μs

Figure 20:
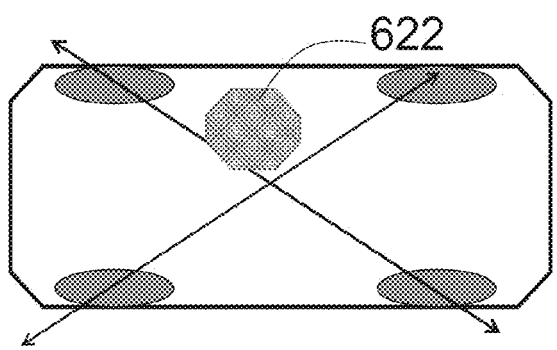
FIG. 20 is a top view of an alternate system for obtaining information about the tires of a vehicle.

Assuming that duration of the interrogation pulse is 0.8 μs as mentioned, an average repetition rate
is obtained 0.8 μs/2090 μs=0.38*10$^{-3}$ Finally, the radiated pulse power is Pp=(4 V)$^2$/(2*50 Ohm)=0.16 W and the average radiated power is Pave=0.16*0.38*10$^{-3}$=0.42*10$^{-3}$ W, or 0.42 mW In another application, the antennas of the array 622 transmit the RF signals simultaneously and space the returns through the use of a delay line in the circuitry from each antenna so that each return is spaced in time in a known manner without requiring that the antennas be switched. Another method is to offset the antenna array, as illustrated in FIG. 20, so that the returns naturally are spaced in time due to the different distances from the tires 621 to the antennas of the array 622. In this case, each signal will return with a different phase and can be separated by this difference in phase using methods known to those in the art.

In another application, not shown, two wide angle antennas can be used such that each receives any four signals but each antenna receives each signal at a slightly different time and different amplitude permitting each signal to be separated by looking at the return from both antennas since, each signal will be received differently based on its angle of arrival.

Additionally, each SAW or transceiver device can be designed to operate on a slightly different frequency and the antennas of the array 622 can be designed to send a chirp signal and the returned signals will then be separated in frequency, permitting the four signals to be separated. Alternately, the four antennas of the array 622 can each transmit an identification signal to permit separation. This identification can be a numerical number or the length of the SAW substrate, for example, can be random so that each property monitor has a slightly different delay built in which permits signal separation. The identification number can be easily achieved in transceiver systems and, with some difficulty and added expense, in SAW systems. Other methods of separating the signals from each of the tires 621 will now be apparent to those skilled in the art. One preferred method in particular will be discussed below and makes use of a transceiver switch.

There are two parameters of SAW system, which has led to the choice of a four echo pulse system:
ITU frequency rules require that the radiated spectrum width be reduced to: Δϕ≤1.75 MHz (in ISM band, F=433.92 MHz);
The range of temperature measurement should be from −40 F up to +260 F.
Therefore, burst (request) pulse duration should be not less than 0.6 microseconds.

$\tau_{bur}=1/\Delta\phi\geq 0.6$ μs

This burst pulse travels to a SAW sensor and then it is returned by the SAW to the interrogator. The sensor's antenna, interdigital transducer (IDT), reflector and the interrogator are subsystems with a restricted frequency pass band. Therefore, an efficient pass band of all the subsystems H(f)$_\Sigma$ will be defined as product of the partial frequency characteristic of all components:

$H(f)_\Sigma = H(f)_1 * H(f)_2 * \ldots H(f)_i$

On the other hand, the frequency H(ϕ)$_\Sigma$ and a time I(τ)$_\Sigma$ response of any system are interlinked to each other by Fourier's transform. Therefore, the shape and duration ($\tau_{echo\,puls}$) an echo signal on input to the quadrature demodulator will differ from an interrogation pulse.

In other words, duration an echo signal on input to the quadrature demodulator is defined as mathematical convolution of a burst signal $\tau_{bur}$ and the total impulse response of the system I(τ)$_\Sigma$.

$\tau_{echo} = \tau_{bur} \otimes I(\tau)_\Sigma$

The task is to determine maximum pulse duration on input to the quadrature demodulator $\tau_{echo}$ under a burst pulse duration $\tau_{bur}$ of 0.6 microseconds. It is necessary to consider in time all echo signals. In addition, it is necessary to take into account the following:
each subsequent echo signal should not begin earlier than the completion of the previous echo pulse. Otherwise, the signals will interfere with each other, and measurement will not be correct;
for normal operation of available microcircuits, it is necessary that the signal has a flat apex with a duration not less than 0.25 microseconds ($\tau_{meg}$=t3−t2). The signal's phase will be constant only on this segment;

the total sensor's pass band (considering double transit IDT and its antenna as a reflector) constitutes 10 MHz;

the total pass band of the interrogator constitutes no more than 4 MHz.

Conducting the corresponding calculations yields the determination that duration of impulse front (t2−t1=t4−t3) constitutes about 0.35 microseconds. Therefore, total duration of one echo pulse is not less than:

$$\tau_{echo}=(t2-t1)+\tau_{meg.}+(t4-t3)=0.35+0.25+0.35=0.95 \text{ µs}$$

Hence, the arrival time of each following echo pulse should be not earlier than 1.0 microsecond. This conclusion is very important.

In Appendix 1 of the '139 application, it is shown that for correct temperature measuring in the required band it is necessary to meet the following conditions:

$$(T2-T1)=1/(72*10-6 \text{ 1/° K}*(125° \text{ C.}-(-40° \text{ C.}))\\ *434.92*106)=194 \text{ ns}$$

This condition is outrageous. If to execute ITU frequency rules, the band of correct temperature measuring will be reduced five times:

$$(125° \text{ C.}-(-40° \text{ C.})*194 \text{ ns})/1000 \text{ ns}=32° \text{ C.}=58° \text{ F.}$$

This is the main reason that it is necessary to add the fourth echo pulse in a sensor. The principle purpose of the fourth echo pulse is to make the temperature measurement unambiguous in a wide interval of temperatures when a longer interrogation pulse is used (the respective time intervals between the sensor's echo pulses are also longer). A mathematical model of the processing of a four-pulse echo that explains these statements is presented in Appendix 3 of the '139 application.

The duration of the interrogation pulse and the time positions of the four pulses are calculated as:

$$T1>4*\tau_{echo}=4.00 \text{ µs}$$

$$T2=T1+\tau_{echo}=5.00 \text{ µs}$$

$$T3=T2+\tau_{echo}=6.00 \text{ µs}$$

$$T4=T3+\tau_{echo}+0.08 \text{ µs}=7.08 \text{ µs}$$

The sensor's design with four pulses is exhibited in FIGS. 25 and 26 of the '834 application.

| | |
|---|---|
| $\tau_{bur}$ | 0.60 µs |
| T1 | 4.00 µs |
| T2 | 5.00 µs |
| T3 | 6.00 µs |
| T4 | 7.08 µs |

The reason that such a design was selected is that this design provides three important conditions:

1. It has the minimum RF signal propagation loss. Both SAW waves use for measuring (which are propagated to the left and to the right from IDT).

2. All parasitic echo signals (signals of multiple transits) are eliminated after the fourth pulse. For example, the pulse is excited by the IDT, then it is reflected from a reflector No 1 and returns to the IDT. The pulse for the second time is re-emitted and it passes the second time on the same trajectory. The total time delay will be 8.0 microseconds in this case.

3. It has the minimum length.

Although the discussion herein concerns the determination of tire information, the same system can be used to determine the location of seats, the location of child seats when equipped with sensors, information about the presence of object or chemicals in vehicular compartments and the like.

Antenna Summary

Information about smart antennas, distributed load monopole antennas, plasma antennas, dielectric antennas and nanotube antennas is set forth in the parent application Ser. No. 11/926,302, which is incorporated by reference herein. These antennas may be used in accordance with any of the disclosed embodiments of the invention herein.

Figure 19:
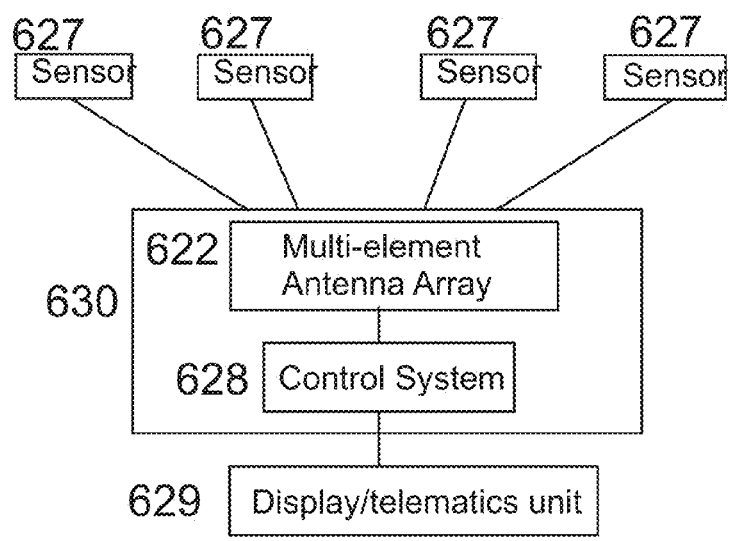
FIG. 19 is a schematic of the system shown in FIGS. 17 and 18.

A general system for obtaining information about a vehicle or a component thereof or therein is illustrated in FIG. 19 and includes multiple sensors 627 which may be arranged at specific locations on the vehicle, on specific components of the vehicle, on objects temporarily placed in the vehicle such as child seats, or on or in any other object in or on the vehicle or in its vicinity about which information is desired. The sensors 627 may be SAW or transceiver sensors or other sensors which generate a return signal upon the detection of a transmitted radio frequency signal. A multi-element antenna array 622 is mounted on the vehicle, in either a central location as shown in FIG. 17 or in an offset location as shown in FIG. 20, to provide the radio frequency signals which cause the sensors 627 to generate the return signals.

A control system 628 is coupled to the antenna array 622 and controls the antennas in the array 622 to be operative as necessary to enable reception of return signals from the sensors 627. There are several ways for the control system 628 to control the array 622, including to cause the antennas to be alternately switched on in order to sequentially transmit the RF signals therefrom and receive the return signals from the sensors 627 and to cause the antennas to transmit the RF signals simultaneously and space the return signals from the sensors 627 via a delay line in circuitry from each antennas such that each return signal is spaced in time in a known manner without requiring switching of the antennas. The control system can also be used to control a smart antenna array.

The control system 628 also processes the return signals to provide information about the vehicle or the component. The processing of the return signals can be any known processing including the use of pattern recognition techniques, neural networks, fuzzy systems and the like.

The antenna array 622 and control system 628 can be housed in a common antenna array housing 630.

Once the information about the vehicle or the component is known, it is directed to a display/telematics/adjustment unit 629 where the information can be displayed on a display 629 to the driver, sent to a remote location for analysis via a telematics unit 629 and/or used to control or adjust a component on, in or near the vehicle. Although several of the figures illustrate applications of these technologies to tire monitoring, it is intended that the principles and devices disclosed can be applied to the monitoring of a wide variety of components on and off a vehicle.

In summary, the use of devices capable of reading or scanning transceiver devices when situated in compartments or spaces defined by vehicles or other mobile assets provides significant advantages. Among other things, it allows for the determination of the identification and location of the transceiver devices and thus objects equipped with such transceiver devices, and with a communications or telematics unit coupled to the interrogator, it allows for communication of that information off of the vehicle, i.e., to one or more remote sites. The overall system identifies the transceiver device if it generates a unique identification code, which is usually the case, and thus can generate a transmission to the remote site containing an identification of an object in a space of a mobile asset.

With the foregoing system, it is possible at the remote site to locate and monitor the transceiver-equipped object.

Alternative or in addition to the communication to a remote site, the interrogator could also transmit or otherwise provide the signal with an identification of the object to another system on the vehicle itself. In this manner, someone looking for a transceiver-equipped object in a space could easily determine its location, such as a package delivery driver looking for a specific package in a truck or an airline worker looking for a specific passenger's luggage.

Referring now to FIGS. 21 and 22, FIG. 21 is a side view of an arrangement of a vehicle 140 and a system for providing a driver 142 of that vehicle 140 with information about location of an object 146 in an interior of the vehicle 140. The vehicle 140 is depicted as a trailer of a truck. However, the invention is applicable to any vehicle with an interior space into which objects are placed for transit or storage and whose location is readily sought to be determined.

Instead of or in addition to the driver 142, the system may be used to provide information to one or more other parties interested in the location of the object 146 in an interior of the vehicle 140, such as, a person unloading the vehicle interior. Most often however, the only person interested in the location of the object in the interior of the vehicle 140 will be the driver, for example, if the driver is a delivery person and seeks to locate the object to deliver to a business establishment or residence. The driver has a telecommunications device 144 with a display or display screen that shows a representation 148 of the interior of the vehicle 140 and a representation 150 of the object 146 therein, thereby enabling the driver to enter into the interior of the vehicle 140 and easily approach the actual location of the object 146 on the vehicle 140 (see FIG. 22). Representations 148, 150 may be icons.

The manner in which the location of the object 146 is determined and converted into the representation 150 may be as described above. For example, a radio-frequency transceiver device 152 is permanently or temporarily mounted on, fixed to, connected to, attached to, or arranged in association with the object 146. The transceiver device 152 on the object may be an active transmitter device that includes a power source for the transceiver device 152. One or more antennas 154 are arranged on a frame 156 of the vehicle 140 to enable transmission of signals into the interior of the vehicle 140 in which the object 146 may be located, and reception of signals from the vehicular interior space. Each antenna 154 is preferably mounted on the frame 156 in a position and orientation to enable transmission of the radio frequency signals into the space and reception of signals from the space. Transmission of radio frequency signals by at least one of the antennas 154 is controlled by means of at least one interrogator 158 after the interrogator 158 has received an object-location request signal from the telecommunications device 144. This telecommunications device 144 may be a smartphone.

In operation, the driver generates a request for the object's location and as a result of this request, radio frequency signals are directed from at least one of the antennas 154, controlled by one or more interrogators 158 (one of which is shown in FIG. 21), into the interior space of the vehicle 140 to cause the transceiver device 152 on the object 146, when present, to return a signal if and when it receives any signal or a signal having a particular ID from any of the antennas 154. Any return signals from the transceiver device 152 are received by the antenna(s) 154. Using a processor 160 associated with the antenna(s), information about the object 146 on which the transceiver device 152 is mounted is obtained based on the return signals, the information including a location of the object 146 in the interior space defined by the frame 156 and/or identification of the object 146.

A communications device 162 is also arranged on the frame 156 and coupled to the interrogator(s) 158. The communications device 162 includes an antenna and other appropriate hardware and software necessary to effect communications to a remote site separate and apart from the vehicle 140. As such, using the communications device 162 and the antenna thereof, the information about the object 146, whether its location or identification or both, is transmitted or otherwise conveyed or directed to the smartphone or telecommunications device 144 separate and apart from the frame 156. At the smartphone or telecommunications device 144, the information providing the location of the transceiver device 152 within the interior space defined by the frame 156 is displayed, e.g., using a representation 148 of the interior space (a rectangle as shown in FIG. 22) and another representation 150 of the object 146.

One of the primary features of the embodiment of the embodiment described with reference to FIGS. 21 and 22 is that the transceiver device 152 may be an RFID or other device such as a Bluetooth or Wi-Fi device. The driver 142 is typically the only one who needs to know where an object 146 is located in the container of the vehicle 140, and possibly other personnel seeking the object 146. If necessary, the driver 142 can transmit via his smartphone or telecommunications device 144 that information elsewhere, e.g., to a remote monitoring location station separate and apart from the vehicle 140 (not shown), but a remote location really only needs to know that the object 146 is in the container. The driver may need to actually find it to retrieve it and deliver to.

The transceiver device 152 may not need to return a signal unless it has the proper ID. That is, an arrangement may be based on an identification scheme whereby the interrogators 158 control the antennas 154 to transmit signals with identification codes so that only one or more of the transceiver devices 152 responsive to the particular identification code, generate return signals. Remaining transceiver devices 152 would not respond to the signals from the antennas 154. This technique would provide a map of sort of different objects and their location in the container. A summary of the identified objects in the container may be provided to the driver 142 or other off-vehicle location.

The processor 160 may be on the smartphone or telecommunications device 144. In this case, the driver or an application on the smartphone or telecommunications device 144 can manipulate the smartphone or telecommunications device 144 in order to direct the interrogator(s) 158 to cause radio frequency signals to be emitted from one or more of the antenna(s) 154. Command logic and wireless transmission protocols for the processor 160 to control the remote interrogators 158 are known to those skilled in the art. Return signals are received by the antenna(s) 154 and the remaining operation of this embodiment is the same as explained above.

The foregoing technique may use an application or a computer program resident on the telecommunications device 144 to enable the driver 142 to locate the object 146 in a container of the vehicle 140, when the object 146 has a radio-frequency transceiver device arranged in connection therewith at least when the object 146 is in a space defined by the container, and the telecommunications device 144 is usable when separate and apart from the vehicle 140. The computer program is resident on computer-readable storage media, i.e., in the memory of the smartphone telecommunications device 144 after having been downloaded in a conventional manner, and is configured to generate, by means of the individual using an user interface (keyboard, microphone, touch screen, etc.) of the telecommunications device 144, a request for location of the object 146 in the space defined by the container, and cause at least one interrogator 158 on the container to direct at least one antenna 154 to transmit radio frequency signals into the space after and in response to receipt of the generated request. As noted above, the transceiver device 152 is preferably an active transmitter device that includes a power source and returns a signal if and when the transceiver device 152 receives any signal or a signal having a particular identification from the at least one antenna 154. The computer program is then configured to derive information about the object 146 on which the transceiver device 152 is mounted based on return signals from the transceiver device 152 received at the at least one antenna 154, the derived information including at least one of a location of the object in the space defined by the frame and an identification of the object. The computer program provides, using the telecommunications device 144, the individual with the information about at least one of the location of the object in the space defined by the frame and the identification of the object, e.g., in a display, vocally, and the like. In this case then, the processor 160 that executes the computer program is located in the telecommunications device 144 and not on the frame of the vehicle 140.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for obtaining information about an object in a container of a movable vehicle and on which a radio-frequency transceiver device is mounted, the object being selectively insertable into and removable from the vehicle, comprising:
   generating a request at a portable telecommunications device proximate or in the container for location of the object in the container, the portable telecommunications device being usable when separate and apart from the vehicle, the portable telecommunications device being configured to use a communications network for voice and data communications between the portable telecommunications device and another remotely situated communications device;
   wirelessly transmitting the generated request from the telecommunications device to the vehicle, the request generated at the telecommunications device being received at at least one interrogator arranged on the vehicle and, after and in response to receipt of the request by the at least one interrogator, the at least one interrogator directing at least one antenna arranged on the vehicle to transmit radio frequency signals into the container, the transceiver device being an active transmitter device that includes a power source and wirelessly transmits a return signal if and when the transceiver device receives any signal or a signal having a particular identification from the at least one antenna;
   wirelessly receiving the return signal transmitted by the transceiver device at the at least one antenna; then
   wirelessly transmitting the return signal received at the at least one antenna or a derivation therefrom from the at least one interrogator to the telecommunications device; then
   deriving, using a processor in the telecommunications device, information about the object on which the transceiver device is mounted based on the return signal, the derived information including a location of the object in the container; and
   displaying on a display of the telecommunications device, a representation of an interior space of the container and the location of the object in the container,
   whereby the display of the location on the object along with the representation of the interior space of the container enables a person to enter the container, be directed to the location of the object in the container, retrieve the object and remove the object from the container.

2. The method of claim 1, wherein the at least one antenna comprises a plurality of antennas.

3. The method of claim 1, wherein the at least one antenna is mounted on the container in a position and orientation to enable transmission of the radio frequency signals into the container and reception of the return signal from the transceiver device in the container.

4. The method of claim 1, wherein the telecommunications device is a smartphone.

5. The method of claim 1, wherein the telecommunications device is configured to generate the request based on an identification of the object or an identification of the transceiver device mounted to the object, such that the at least one interrogator is caused to direct the at least one antenna to transmit radio frequency signals with the identification, the transceiver device wirelessly transmitting the return signal only when the transceiver device receives a signal having its identification.

6. An arrangement for obtaining information about an object on which a radio-frequency transceiver device is mounted when the object is situated in a vehicle, the object being selectively insertable into and removable from the vehicle, comprising:
   a frame defining an interior space of the vehicle;
   at least one antenna arranged on said frame and enabling transmission of radio frequency signals into the space and reception of signals from the space;
   a portable telecommunications device that, when proximate or in the container, generates a request for location of the object in the space, said telecommunications device being usable when separate and apart from the vehicle, the portable telecommunications device being configured to use a communications network for voice and data communications between the portable telecommunications device and another remotely situated communications device, the generated request being wirelessly transmitted from the telecommunications device to said frame;
   at least one interrogator coupled to said at least one antenna, arranged on said frame and configured to receive the request generated at said telecommunications device, and after and in response to receipt of the request by the at least one interrogator, control transmission of radio frequency signals by said at least one antenna into the space whereby when a transceiver device in the space, that is an active transmitter device having a power source, receives any signal or a signal having a particular identification from said at least one antenna, the transceiver device wirelessly transmits a return signal, said at least one antenna being configured to wirelessly receive the return signal transmitted by any transceiver devices in the space, said at least one interrogator being further configured to wirelessly transmit the return signal received at said at least one antenna or a derivation therefrom to said telecommunications device; and a processor configured to derive information about the object on which the transceiver device is mounted based on the return signal, the derived information including a location of the object in the space defined by said frame, said processor being situated in the telecommunications device;

said telecommunications device including a display on which a representation of the interior space said frame and the location of the object in the space, whereby the display of the location on the object along with the representation of the interior space of said frame enables a person to enter the interior space of said frame, be directed to the location of the object in the space defined by said frame, retrieve the object and remove the object from the vehicle.

7. The arrangement of claim 6, wherein said at least one antenna comprises a plurality of antennas.

8. The arrangement of claim 6, wherein said at least one antenna is mounted on said frame in a position and orientation to enable transmission of the radio frequency signals into the space and reception of the return signal from the transceiver device in the space.

9. The arrangement of claim 6, wherein said telecommunications device is a smartphone.

10. The arrangement of claim 6, wherein said telecommunications device is configured to generate the request based on an identification of the object or an identification of the transceiver device mounted to the object, such that said at least one interrogator is caused to direct said at least one antenna to transmit radio frequency signals with the identification, the transceiver device wirelessly transmitting the return signal only when the transceiver device receives a signal having its identification.

11. A method for enabling an individual to locate a removable object in a container of a vehicle, the object having a radio-frequency transceiver device arranged in connection therewith at least when the object is in a space defined by the container, comprising:

generating, by means of the individual using an user interface of a portable telecommunications device proximate or in the container, a request for location of the object in the space defined by the container, the portable telecommunications device being usable when separate and apart from the vehicle, the portable communications device being configured to use a telecommunications network for voice and data communications between the portable telecommunications device and another remotely situated communications device;

wirelessly transmitting the generated request from the telecommunications device to the container, the request generated at the telecommunications device being received at at least one interrogator arranged on the vehicle and, after and in response to receipt of the request by the at least one interrogator, the at least one interrogator directing at least one antenna arranged on the container to transmit radio frequency signals into the space, the transceiver device being an active transmitter device that includes a power source and wirelessly transmits a return signal if and when the transceiver device receives any signal or a signal having a particular identification from the at least one antenna;

wirelessly receiving the return signal transmitted by the transceiver device at the at least one antenna;

wirelessly transmitting the return signal received at the at least one antenna or a derivation therefrom from the at least one interrogator to the telecommunications device;

deriving, using a processor in the telecommunications device, information about the object on which the transceiver device is mounted based on the return signal, the derived information including a location of the object in the space defined by the container; and displaying on a display of the telecommunications device viewable to the individual, a representation of the interior space of the container and the location of the object in the container, whereby the display of the location on the object along with the representation of the interior space of the container enables the individual to enter the container, be directed to the location of the object in the container, retrieve the object and remove the object from the container.

12. The method of claim 11, wherein the derived information includes an identification of the object, further comprising displaying on the display of the telecommunications device the identification of the object.

13. The method of claim 11, wherein the at least one antenna comprises a plurality of antennas.

14. The method of claim 11, wherein the at least one antenna is mounted on the container in a position and orientation to enable transmission of the radio frequency signals into the space and reception of the return signal from the transceiver device in the space.

15. The method of claim 11, wherein the telecommunications device is a smartphone.

16. The method of claim 11, wherein the telecommunications device is configured to generate the request based on an identification of the object or an identification of the transceiver device mounted to the object, such that the at least one interrogator is caused to direct the at least one antenna to transmit radio frequency signals with the identification, the transceiver device wirelessly transmitting the return signal only when the transceiver device receives a signal having its identification.

17. A telecommunications device that enables an individual to locate a removable object in a container of a vehicle, the object having a radio-frequency transceiver device arranged in connection therewith at least when the object is in a space defined by the container, the telecommunications device being usable when separate and apart from the vehicle, the telecommunications device being configured to use a communications network for voice and data communications between the telecommunications device and another remotely situated communications device, the telecommunications device including non-transitory, tangible computer-readable storage media on which a computer program is embodied that is configured to:

generate, by means of the individual using a user interface of the telecommunications device, a request for location of the object in the space defined by the container, cause wireless transmission of the generated request from the telecommunications device to the container;

cause at least one interrogator on the container to direct at least one antenna on the container to transmit radio frequency signals into the space after and in response to receipt of the generated request, the transceiver device being an active transmitter device that includes a power source and wirelessly transmits a return signal if and when the transceiver device receives any signal or a signal having a particular identification from the at least one antenna;

cause the at least one antenna to wirelessly receive the return signal transmitted by the transceiver device;

cause the at least one interrogator to wirelessly transmit the return signal received at the at least one antenna or a derivation therefrom to the telecommunications device;

derive information about the object on which the transceiver device is mounted based on the return signal from the transceiver device that has been wirelessly received at the at least one antenna and wirelessly transmitted by the at least one interrogator to the telecommunications device, the derived information including a location of the object in the space defined by the container; and displaying on a display of the telecommunications device viewable to the individual, a representation of the interior space of the container and the location of the object in the container, whereby the display of the location on the object along with the representation of the interior space of the container enables the individual to enter the container, be directed to the location of the object in the container, retrieve the object and remove the object from the container.

18. The method of claim 1, wherein the derived information includes an identification of the object, further comprising displaying on the display of the telecommunications device the identification of the object.

19. The arrangement of claim 6, wherein the derived information includes an identification of the object which is displayed by said display.

* * * * *